United States Patent
Ozawa et al.

(10) Patent No.: US 9,063,646 B2
(45) Date of Patent: Jun. 23, 2015

(54) IMAGE PROCESSING APPARATUS, IMAGE PROCESSING METHOD, AND IMAGE DISPLAY PROGRAM

(75) Inventors: Hiroyuki Ozawa, Tokyo (JP); Nobuki Furue, Tokyo (JP); Satoshi Akagawa, Tokyo (JP); Ayako Iwase, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 421 days.

(21) Appl. No.: 12/607,475

(22) Filed: Oct. 28, 2009

(65) Prior Publication Data

US 2010/0123734 A1 May 20, 2010

(30) Foreign Application Priority Data

Nov. 19, 2008 (JP) ................................. 2008-295304

(51) Int. Cl.
- *G06F 3/0488* (2013.01)
- *G09G 5/34* (2006.01)
- *G09G 5/14* (2006.01)
- *G06F 3/0485* (2013.01)
- *G06F 3/0481* (2013.01)

(52) U.S. Cl.
CPC .............. *G06F 3/0488* (2013.01); *G09G 5/346* (2013.01); *G09G 5/14* (2013.01); *G06F 3/0485* (2013.01); *G06F 3/04812* (2013.01); *G06F 3/04855* (2013.01)

(58) Field of Classification Search
CPC .............. G06F 3/0485; G06F 3/04812; G06F 3/04855; G09G 5/346; G09G 5/14
USPC ........... 345/173, 179, 419; 715/722, 863, 823
See application file for complete search history.

(56) References Cited

U.S. PATENT DOCUMENTS

| | | | | |
|---|---|---|---|---|
| 5,499,330 | A | * | 3/1996 | Lucas et al. .................... 715/205 |
| 5,969,706 | A | | 10/1999 | Tanimoto et al. |
| 6,147,703 | A | * | 11/2000 | Miller et al. ................ 348/220.1 |
| 6,233,015 | B1 | * | 5/2001 | Miller et al. ............. 348/333.05 |
| 6,538,698 | B1 | * | 3/2003 | Anderson ................ 348/333.05 |

(Continued)

FOREIGN PATENT DOCUMENTS

| EP | 1 850 213 A2 | 10/2007 |
|---|---|---|
| JP | 2001-306375 | 11/2001 |

(Continued)

OTHER PUBLICATIONS

U.S. Appl. No. 12/479,269, filed Jun. 5, 2009, Ozawa et al.

(Continued)

*Primary Examiner* — Abderrahim Merouan
(74) *Attorney, Agent, or Firm* — Oblon, McClelland, Maier & Neustadt, L.L.P.

(57) ABSTRACT

An image processing apparatus includes a pointed-position detecting section that accepts a pointing operation via an operating surface provided on a display screen of an image display device, and detects and outputs a position pointed at by the pointing operation on the operating surface. The image processing apparatus also includes a display control section that displays on the image display device an image. The display control section controls the image display device to display a first size image for a predetermined time while the pointing operation continues and then displays a plurality of images having a size smaller than the first size in response to a determination that the pointing operation has held the position for the predetermined time.

13 Claims, 17 Drawing Sheets

(56) References Cited

U.S. PATENT DOCUMENTS

| | | |
|---|---|---|
| 7,080,394 B2 * | 7/2006 | Istvan et al. .................. 725/43 |
| 7,152,210 B1 | 12/2006 | Van Den Hoven et al. |
| 7,643,012 B2 * | 1/2010 | Kim et al. .................. 345/173 |
| 8,553,130 B2 * | 10/2013 | Yoshimi et al. .......... 348/333.05 |
| 2002/0033848 A1 * | 3/2002 | Sciammarella et al. ...... 345/838 |
| 2002/0036618 A1 * | 3/2002 | Wakai et al. .................. 345/157 |
| 2002/0167540 A1 * | 11/2002 | Dobbelaar .................... 345/716 |
| 2003/0122787 A1 | 7/2003 | Zimmerman et al. |
| 2004/0125088 A1 | 7/2004 | Zimmerman et al. |
| 2004/0160458 A1 * | 8/2004 | Igarashi et al. ............... 345/660 |
| 2005/0267676 A1 * | 12/2005 | Nezu et al. .................... 701/200 |
| 2006/0026521 A1 | 2/2006 | Hotelling et al. |
| 2006/0026535 A1 | 2/2006 | Hotelling et al. |
| 2006/0026536 A1 | 2/2006 | Hotelling et al. |
| 2006/0109283 A1 * | 5/2006 | Shipman et al. ............. 345/629 |
| 2006/0274046 A1 * | 12/2006 | Hillis et al. .................. 345/173 |
| 2007/0087781 A1 * | 4/2007 | Bettis et al. ................ 455/556.1 |
| 2007/0146337 A1 * | 6/2007 | Ording et al. ............... 345/173 |
| 2007/0146504 A1 * | 6/2007 | Morimoto et al. ......... 348/231.3 |
| 2007/0168413 A1 * | 7/2007 | Barletta et al. ............... 709/203 |
| 2007/0236475 A1 * | 10/2007 | Wherry ........................ 345/173 |
| 2007/0268280 A1 * | 11/2007 | Fujita et al. .................. 345/204 |
| 2008/0024444 A1 * | 1/2008 | Abe et al. ..................... 345/157 |
| 2008/0204426 A1 | 8/2008 | Hotelling et al. |
| 2008/0211775 A1 | 9/2008 | Hotelling et al. |
| 2008/0211783 A1 | 9/2008 | Hotelling et al. |
| 2008/0211784 A1 | 9/2008 | Hotelling et al. |
| 2008/0211785 A1 | 9/2008 | Hotelling et al. |
| 2008/0231610 A1 | 9/2008 | Hotelling et al. |
| 2008/0309632 A1 * | 12/2008 | Westerman et al. .......... 345/173 |
| 2009/0158326 A1 * | 6/2009 | Hunt et al. ..................... 725/38 |
| 2010/0095240 A1 * | 4/2010 | Shiplacoff et al. ............ 715/784 |
| 2010/0125786 A1 * | 5/2010 | Ozawa et al. ................. 715/702 |
| 2011/0154196 A1 * | 6/2011 | Icho et al. ..................... 715/702 |

FOREIGN PATENT DOCUMENTS

| | | |
|---|---|---|
| JP | 2005-234291 A | 9/2005 |
| JP | 2008-33695 | 2/2008 |
| JP | 2008269448 A * | 11/2008 |
| WO | WO 01/29702 A2 | 4/2001 |

OTHER PUBLICATIONS

U.S. Appl. No. 12/496,984, filed Jul. 2, 2009, Iwase et al.
U.S. Appl. No. 12/499,349, filed Jul. 8, 2009, Ozawa et al.
U.S. Appl. No. 12/508,909, filed Jun. 24, 2009, Ozawa et al.
U.S. Appl. No. 12/509,045, filed Jul. 24, 2009, Iwase et al.
U.S. Appl. No. 12/559,163, filed Sep. 14, 2009, Ozawa et al.
U.S. Appl. No. 12/580,627, filed Oct. 16, 2009, Ozawa et al.
U.S. Appl. No. 12/582,046, filed Oct. 20, 2009, Iwase et al.
U.S. Appl. No. 12/604,795, filed Oct. 23, 2009, Iwase et al.
U.S. Appl. No. 12/607,508, filed Oct. 28, 2009, Iwase et al.
European Search Report issued Jul. 8, 2011, in Patent Application No. 09176454.8.
U.S. Appl. No. 12/776,856, filed May 10, 2010, Iwase et al.
Office Action issued Feb. 24, 2011 in Japan Application No. 2008-295304.
Japanese Office Action dated Aug. 25, 2010 in corresponding Japanese Application No. 2008-295304.

* cited by examiner

FIG. 2

| FOLDER NAME | CREATION DATE AND TIME | METADATA | |
|---|---|---|---|
| SHOOTING DATE AND TIME | FILE NAME 1 | ADDRESS ON RECORDING MEDIUM | |
| SHOOTING DATE AND TIME | FILE NAME 2 | ADDRESS ON RECORDING MEDIUM | |
| SHOOTING DATE AND TIME | FILE NAME 3 | ADDRESS ON RECORDING MEDIUM | |
| ⋮ | ⋮ | ⋮ | |

FIG. 3

| FOLDER NAME | CREATION DATE AND TIME | METADATA |
|---|---|---|
| IMAGE DATA | | |

FIG. 4
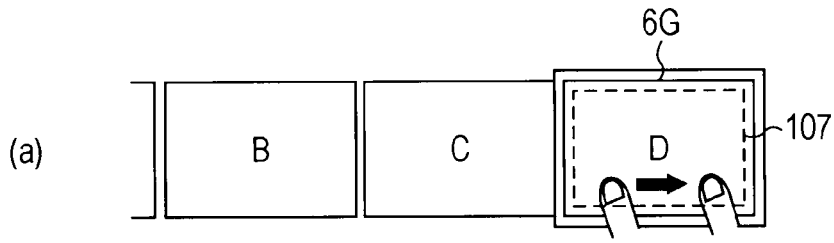
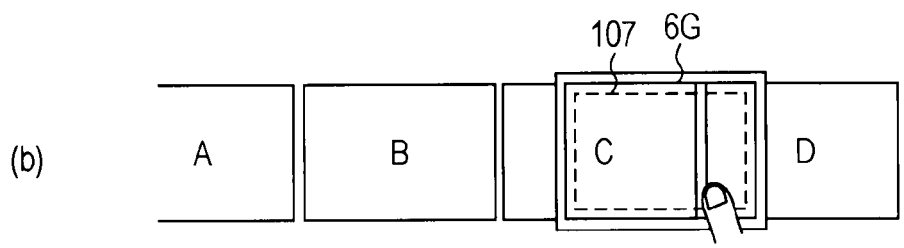
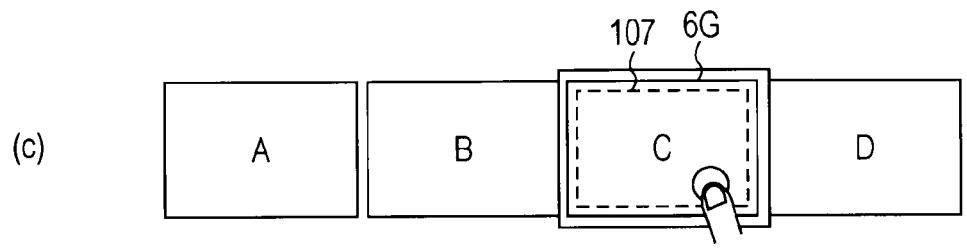
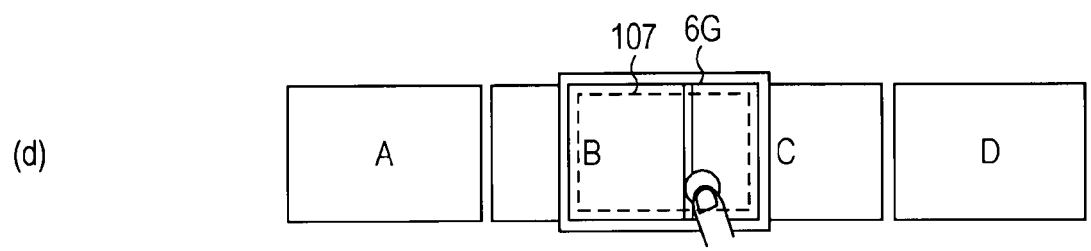
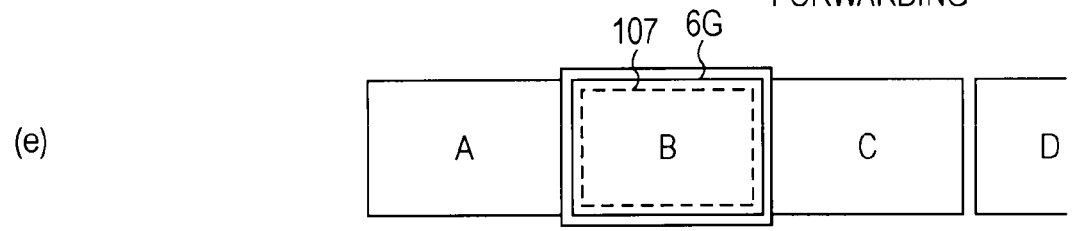

FIG. 7
(a) HOLD CONTACT AFTER → START AND CONTINUE
TRACING OPERATION    IMAGE FORWARDING
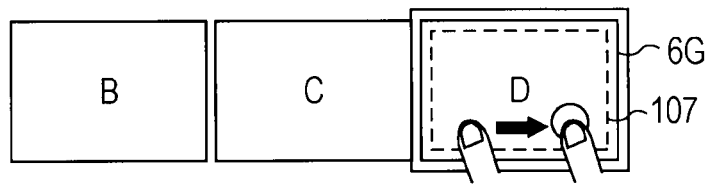
(b) 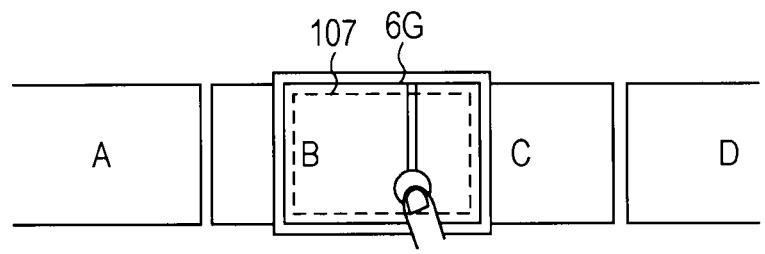
(c) HOLD TIME EXCEEDS → DISPLAY PLURAL IMAGES,
FIXED TIME            AND CONTINUE FORWARDING
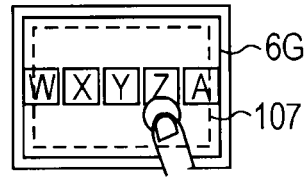
(d) RELEASE CONTACT → END IMAGE FORWARDING
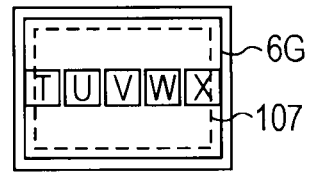
(e) DISPLAY OF ONE IMAGE
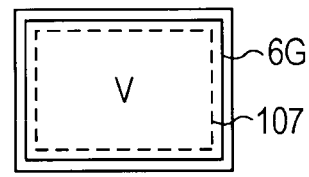

IMAGE PROCESSING APPARATUS, IMAGE PROCESSING METHOD, AND IMAGE DISPLAY PROGRAM

BACKGROUND OF THE INVENTION

1. Field of the Invention

The present invention relates to, for example, an apparatus that includes a display device having a relatively large display screen and can display various images, such as a digital still camera, and a method and a program used for the apparatus.

2. Description of the Related Art

Digital still cameras that record shot images on a recording medium as digital data are in widespread use. With recent reductions in the size and increases in the capacity of built-in flash memories or removable memories used in digital still cameras, it is now possible to accumulate a large amount of image data in these memories.

As a digital still camera is used over years, the number of shot and accumulated images increases. Not infrequently, too many pieces of image data that can be managed in the user's head are stored in a built-in flash memory or a removable memory.

To find a target image from among a large number of images accumulated on a recording medium as mentioned above, typically, accumulated images are played back one by one and displayed on the display screen to be checked.

That is, in the case of a digital still camera according to the related art, typically, upon entering image playback mode, the digital still camera transitions to a state in which, for example, an image selected by the user from among images recorded on the recording medium is displayed across the entire display image.

To view an image following or preceding the currently displayed image, for example, a hardware key such as a cross key is operated to forward or reverse the display image one by one. Therefore, it is sometimes necessary to operate the hardware key many times until a target image is displayed.

Some image display apparatuses that display an image allow the display image to be forwarded/reversed by performing a flick operation in an arbitrary direction by using a finger or the like, on a touch panel provided on the display screen.

The operation of forwarding/reversing the display image on the touch panel is an intuitive operation for the user, and is easy to understand and excellent in terms of operability. However, such an operation of forwarding or reversing the display image on the touch panel is the same as the operation using a hardware key in that it is necessary to perform the operation on the touch panel a plurality of times until a target image is displayed.

Accordingly, for example, Japanese Unexamined Patent Application Publication No. 2008-033695 discloses a technique in which the amount of scrolling is calculated from the distance of a so-called drag operation (distance between the start point of a drag operation and a reference point), and an image is scrolled on the basis of this calculated amount of scrolling.

With the technique according to Japanese Unexamined Patent Application Publication No. 2008-033695, the user can scroll the display image by an appropriate amount by a single drag operation, thereby enabling quick retrieval of a target image.

SUMMARY OF THE INVENTION

In the case of the technique according to Japanese Unexamined Patent Application Publication No. 2008-033695 mentioned above, the amount of scrolling is determined in accordance with the distance of a drag operation. Thus, to increase the amount of scrolling, it is necessary to perform a long drag operation.

However, in the case of a drag operation performed by using a pointing device such as a mouse, typically, the possible range of operation is limited. In some cases, it is not possible for the user to continuously perform a necessary amount of drag operation.

Even if the amount of image scrolling can be increased by performing a long drag operation, the display time per one image becomes short, which sometimes makes it difficult to recognize an image displayed during scrolling.

In the case where, as mentioned above, a flick operation on the touch panel is set as an operation for instructing forwarding/reversing of a display image, it is also conceivable to control the amount of scrolling of the display image in accordance with the distance over which a finger or the like is held in contact with the operating surface, or the speed of the operation.

However, there are also limits to the distance or speed of a flick operation made on the touch panel, and it is sometimes not possible to perform an amount of scrolling intended by the user. In this case as well, it is sometimes necessary to perform a flick operation on the touch panel a plurality of times.

As mentioned above, in various kinds of equipment that displays a recorded image, to retrieve a target image from among a large number of images, it is necessary to perform complex operations or repetitive operations. Thus, it is sometimes not possible to perform easy and quick image retrieval.

Not only when retrieving an image but also when enlarging or reducing a display image, it is sometimes necessary to repeat an operation for enlarging the display image or an operation for reducing the display image until a target image is displayed.

When changing the playback speed of a moving image as well, for example, it is sometimes necessary to operate a predetermined operating key such as a fast-forward button a plurality of times until a target playback speed such as 10-times speed or 20-times speed is achieved.

It is desirable to allow an image display process executed in accordance with an initial operation to be continued in a manner intended by the user, without performing frequent operations or complex operations.

To solve the above-mentioned problems, an imaging processing apparatus according to an embodiment of the present invention includes: an image display device; pointed-position detecting means for accepting a pointing operation from a user via an operating surface provided on a display screen of the image display device, and detecting and outputting a position pointed by the pointing operation on the operating surface; storing means for storing image data; and display control means for displaying on the image display device an image according to the image data stored by the storing means. When the pointing operation is made on the operating surface by the user, the display control means starts a display process of an image on the image display device in a manner according to the pointing operation made by the user which is determined on the basis of a detection output from the pointed-position detecting means, and continues the display process when pointing on the operating surface continues successively from the pointing operation on the operating surface.

In accordance with the image processing apparatus according to the above embodiment of the present invention, the display control means has a function of displaying an image according to image data stored by the storing means, on the display screen of the image display device. When a pointing operation is made on the operating surface of the pointed-position detecting means, a display process of an image is started by the display control means in a manner according to the pointing operation made on the operating surface, and while pointing on the operating surface continues successively from the pointing operation, the display process in a manner according to the pointing operation is continued.

Thus, by performing a pointing operation on the operating surface, the user can start an image display process in a manner according to the pointing operation. Then, the display process can be continued while pointing on the operating surface continues successively from the pointing operation. Therefore, an image display process intended by the user can be started by a simple action, and the image display process can be continued in a manner intended by the user.

According to an embodiment of the present invention, an image display process started in accordance with an initial operation can be continued as desired by the user in a manner intended by the user, without performing frequent operations or complex operations.

BRIEF DESCRIPTION OF THE DRAWINGS

FIG. 2 is a diagram illustrating a layout example of an image folder generated on a recording medium of the imaging apparatus;

FIG. 3 is a diagram illustrating a layout example of an image file generated on the recording medium of the imaging apparatus;

FIG. 4 is a diagram illustrating the manner in which an image is displayed at the time of scrolling of a display image which is performed in the imaging apparatus according to the first embodiment;

FIG. 7 is a diagram illustrating the manner in which an image is displayed at the time of scrolling of a display image which is performed in an imaging apparatus according to a second embodiment;

DESCRIPTION OF THE PREFERRED EMBODIMENTS

Hereinbelow, an apparatus, a method, and a program according to an embodiment of the present invention will be described with reference to the drawings.

[First Embodiment]
[Configuration Example of Imaging Apparatus]

Figure 1:
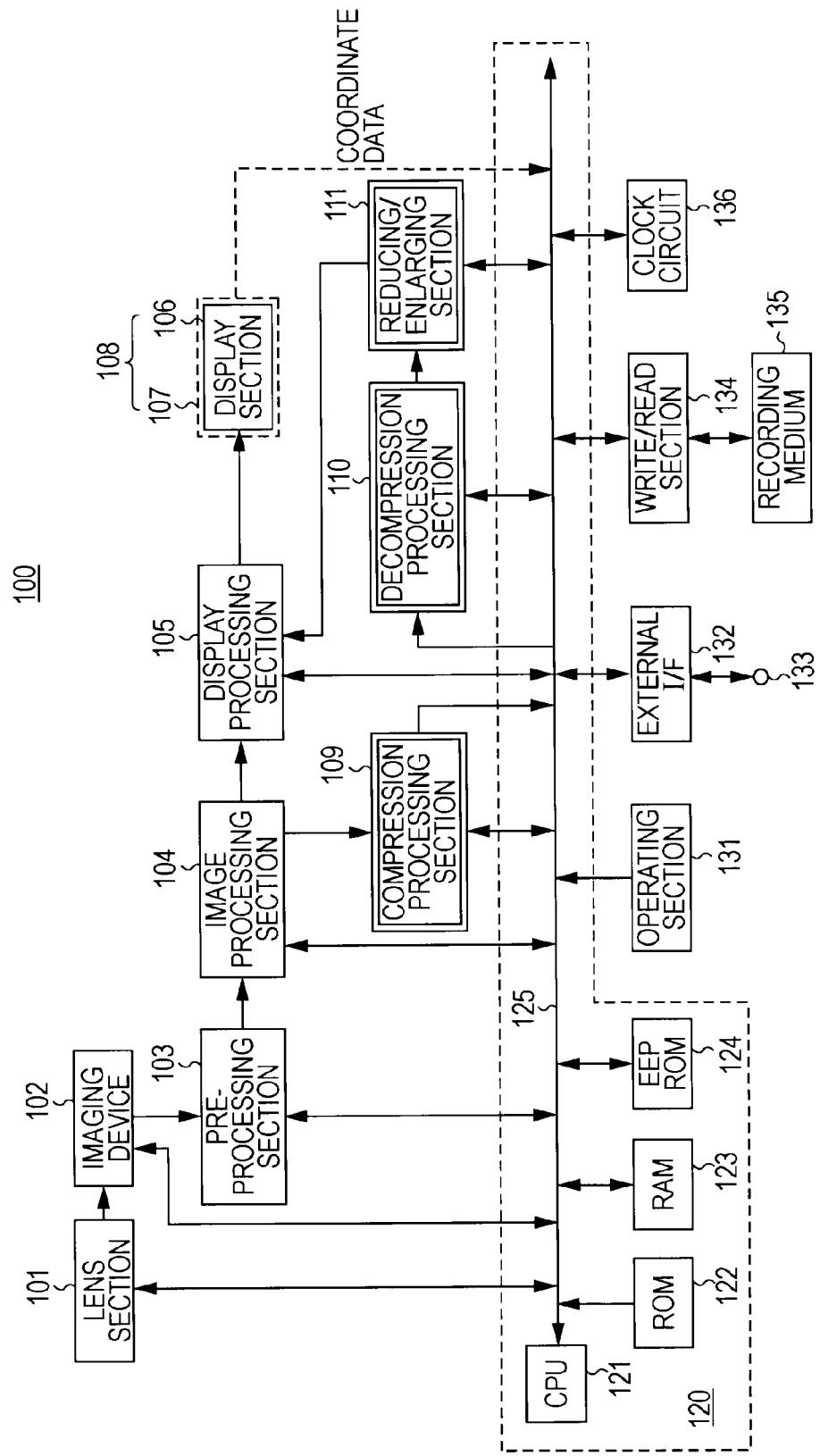
FIG. 1 is a block diagram illustrating a configuration example of an imaging apparatus according to a first embodiment to which an apparatus, a method, and a program according to an embodiment of the present invention is applied.

FIG. 1 is a block diagram showing a configuration example of an imaging apparatus 100 according to a first embodiment to which an apparatus, a method, and a program according to an embodiment of the present invention is applied. The imaging apparatus 100 can switch between shooting modes to shoot both still images and moving images and record the images onto a recording medium.

However, in the following description of the first embodiment, for the simplicity of description, a description will be given of the configuration and operation of the imaging apparatus 100 in a case when the imaging apparatus 100 is used to function as a digital still camera, and shoots or plays back mainly still images.

As shown in FIG. 1, the imaging apparatus 100 includes a lens section 101, an imaging device 102, a pre-processing section 103, an image processing section 104, a display processing section 105, a display section 106, a touch panel 107, a compression processing section 109, a decompression processing section 110, and a reducing/enlarging section 111.

The imaging apparatus 100 also includes a control section 120, an operating section 131, an external interface (hereinafter, abbreviated as external I/F) 132, an input/output terminal 133, a write/read section 134, a recording medium 135, and a clock circuit 136.

The display section 106 is made of, for example, a so-called thin display device such as an LCD (Liquid Crystal Display) or an organic EL (Electroluminescence) panel. As will be described later, a touch panel 107 is attached to the entire surface of the display screen of the display section 106 so as to form an operating surface.

The touch panel 107 accepts a pointing operation (contacting operation) on the operating surface from the user, detects the pointed position (contact position) on the operating surface of the touch panel 107, and notifies the control section 120 of coordinate data indicating the pointed position.

As will be described later, the control section 120 controls individual sections of the imaging apparatus 100, and also grasps what kind of display is being made on the display screen of the display section 106. The control section 120 can accept a pointing operation (input operation) from the user on the basis of coordinate data indicating a pointed position on the operating surface from the touch panel 107, and display information on the display screen of the display section 106 corresponding to the pointed position.

For example, suppose that a user places a finger, a stylus, or the like in contact with the operating surface of the touch panel 107. In this case, when a numeral is displayed at a position on the display screen which corresponds to (coincides with) the contact position, it can be determined by the control section 120 that the user has selected the displayed numeral for input.

In this way, in the imaging apparatus 100, the display section 106 and the touch panel 107 form a touch screen 108 as an input apparatus. The touch panel 107 can be implemented as, for example, a pressure-sensitive or electrostatic one.

In addition, the touch panel 107 can detect each of operations made simultaneously at a plurality of locations on the operating surface, and output coordinate data indicating each corresponding contact position. The touch panel 107 can also detect each of pointing operations repeatedly made on the operating surface, and output coordinate data indicating each corresponding contacting operation.

Further, while a finger or a stylus is held in contact with the touch panel 107 by the user, the touch panel 107 can also detect the contact position successively at each predetermined timing, and output coordinate data indicating the contact position.

Thus, the touch panel 107 can accept various kinds of pointing operation (operation input) from the user, such as so-called tap operation, double-tap operation, drag operation, flick operation, and pinch operation, and detects the operation.

In this regard, a tap operation is an action (operation) of pointing at a single predetermined point on the operating surface only once in a tap motion. A double-tap operation is an action of successively pointing at a single predetermined point on the operating surface twice in a tap-tap motion.

A drag operation is an action of moving a user's finger or stylus while keeping the finger or stylus in contact with the operating surface. A flick operation is an action of pointing at a single point on the operating surface with a user's finger or stylus, and then quickly "flicking" the finger or stylus in that state in an arbitrary direction.

A pinch operation is an action of placing two user's fingers or the like in contact with the operating surface simultaneously, and then spreading apart or closing together the two fingers or the like. In this case, specifically, an operation of spreading apart the two fingers or the like held in contact is referred to as pinch-out operation, and an operation of closing the two fingers or the like together is referred to as pinch-in operation.

Although differing in the speed of action, a drag operation and a flick operation are both an operation of placing a user's finger or the like in contact with the operating surface and then moving the finger or the like on the operating surface (tracing the operating surface), and can be grasped on the basis of two kinds of information, the distance of movement and the direction of movement.

For this reason, in this specification, where the same process can be performed by performing either a drag operation or a flick operation, the word "tracing operation" is used to generically refer to a drag operation and a flick operation.

The control section 120 is connected to individual sections constituting the imaging apparatus 100 to control the individual sections of the imaging apparatus 100 as mentioned above, and is configured as a so-called microcomputer.

The control section 120 includes a CPU (Central Processing Unit) 121, a ROM (Read Only Memory) 122, a RAM (Random Access Memory) 123, and an EEPROM (Electrically Erasable and Programmable ROM) 124 that are connected via a CPU bus 125.

The CPU 121 reads and executes a program stored in the ROM 122 described later, generates a control signal to be supplied to each section, and supplies this control signal to each section. Also, the CPU 121 accepts data or the like provided from each section, and processes this data.

As mentioned above, the ROM 122 stores and holds various programs executed by the CPU 121, various data necessary for processing, and the like in advance. The RAM 123 is mainly used as a work area, such as for temporary storage of intermediate results in various kinds of processing.

The EEPROM 124 is a so-called non-volatile memory, and stores and holds information that should be held even when the power of the imaging apparatus 100 is turned off. For example, various parameters set by the user or the final results of various processing, or processing programs, data, or the like additionally provided for addition of functions or the like are held in the EEPROM 124.

As shown in FIG. 1, in addition to various circuit sections for implementing a shooting function and a playback function of shot and recorded images which will be described later, the operating section 131, the external I/F 132, the write/read section 134, and the clock circuit 136 are connected to the control section 120 configured as mentioned above.

The operating section 131 has operating keys such as various adjustment keys, function keys, and shutter keys, and accepts an operation input from the user and notifies the control section 120 of this operation input. Thus, in accordance with the operation input from the user accepted via the operating section 131, the control section 120 can control individual sections to execute processing based on the operation input.

The external I/F 132 is, for example, a digital interface conforming to a predetermined standard, such as USB (Universal Serial Bus) or IEEE (Institute of Electrical and Electronics Engineers Inc) 1394.

That is, the external I/F 132 accepts data from external equipment connected to the input/output terminal 133 by converting the data into a format that allows processing by the imaging apparatus 100, or outputs data to be sent out from the imaging apparatus 100 by converting the data into a predetermined format.

The write/read section 134 writes data onto the recording medium 135 of the imaging apparatus 100, or reads data recorded on the recording medium 135, in accordance with control by the control section 120.

In the imaging apparatus 100, the recording medium 135 is configured to be removable from the imaging apparatus 100 and is, for example, a so-called memory card type removable memory for which a semiconductor memory is used and which has a storage capacity of several gigabytes or more.

Other than a memory card type removable memory, for example, a built-in recording medium such as a built-in flash memory or a compact hard disk can be also used as the recording medium 135.

Other types of removable recording medium such as a compact optical disc such as a DVD (Digital Versatile Disc) or a CD (Compact Disc) can be also used as the recording medium 135.

The clock circuit 136 includes a calendar function, and can provide the current year/month/day, the current day of the week, and the current time and, as necessary, can implement even a time counter function of measuring a predetermined time interval.

With this function of the clock circuit 136, information related to the shooting date, such as the date and time of shooting and the day of the week of shooting, can be appended to image data that has been shot. In addition, by using the function of the clock circuit 136, it is possible to implement even a self-timer shooting function that makes it possible to fire the shutter to shoot automatically after elapse of a fixed period of time from a predetermined operation.

In the imaging apparatus 100 shown in FIG. 1, although not shown, the lens section 101 is a portion which includes an imaging lens (objective lens), an exposure adjustment mechanism, a focus adjustment mechanism, a shutter mechanism, and the like, and captures the image of a subject and forms the image on the sensor surface of an imaging device in the subsequent stage.

The imaging device 102 is made of an imaging sensor (imaging device) such as a CCD (Charge Coupled Device) or CMOS (Complementary Metal Oxide Semiconductor) image sensor. The imaging device 102 captures an image formed on its own sensor surface via the lens section 101, as an electrical signal (image signal).

In the imaging apparatus 100, the imaging device 102 includes a single plate color filter of a predetermined color pattern which is configured to generate a signal of either R (red), G (green), or B (blue) for each pixel.

Then, the image signal captured via the imaging device 102 is supplied to the pre-processing section 103 in the subsequent stage. The pre-processing section 103 includes a CDS (Correlated Double Sampling) circuit, an AGC (Automatic Gain Control) circuit, an A/D (Analog/Digital) converter, and the like, and captures the image signal from the imaging device 102 as digital data.

The image signal (image data) captured via the pre-processing section 103 is supplied to the image processing section 104. The image processing section 104 has, although not shown, a detection circuit, a white balance circuit, a de-mosaic circuit, a resolution conversion circuit, and other such image correction circuit or the like.

In the image processing section 104, first, on the basis of the image data from the pre-processing section 103, parameters for various adjustment processes, such as a parameter for exposure adjustment, a parameter for focus adjustment, and a parameter for white balance adjustment are generated.

Among the parameters generated in the image processing section 104, the parameter for exposure adjustment and the parameter for focus adjustment are supplied to the control section 120. On the basis of the parameters from the image processing section 104, the control section 120 can control the exposure adjustment mechanism and focus adjustment mechanism of the lens section 102 to perform appropriate adjustment for exposure and focus.

Then, the image processing section 104 performs a black level matching process, or a white balance adjustment process based on the parameter for white balance adjustment generated as mentioned above, on the image data from the pre-processing section 103. Through these adjustment processes, an adjustment is made so that an image generated by the image data from the pre-processing section 103 has appropriate color shade.

Thereafter, the image processing section 104 performs a demosaic process (synchronization process) for generating RGB data (three primary-color data), an aperture correction process, a gamma ($\gamma$) correction process, and the like, on the image data that has been adjusted so as to have appropriate color shade.

Further, the image processing section 104 performs a Y/C conversion process for generating a luminance signal (Y) and chrominance signals (Cb, Cr) from the generated RGB data, a chromatic aberration correcting process, a resolution conversion process, and the like to form the luminance signal Y and the chrominance signals Cb, Cr.

The pieces of image data (the luminance signal Y and the chrominance signals Cb, Cr) generated in the image processing section 104 are supplied to the display processing section 105, where the pieces of image data are converted into image signals in a format for supply to the display section 106 and are supplied to the display section 106.

Thus, a subject's image captured via the lens section 101 is displayed on the display screen of the display section 106. The user can shoot a target subject's image while checking the subject's image displayed on the display screen of the display section 106.

At the same time, the luminance signal Y and the chrominance signals Cb, Cr generated in the image processing section 104 are also supplied to the compression processing section 109. Then, at the timing when the shutter key of the operating section 131 is depressed, the compression processing section 109 compresses the image data of an image displayed on the display screen of the display section 106 at that point in time, and supplies this compressed data to the control section 120.

In the compression processing section 103, a data compression process is performed in accordance with a data compression scheme determined in advance. As the data compression scheme, the JPEG (Joint Photographic Experts Group) scheme is used in the case of a still image, and the MPEG (Moving picture Experts Group) or the like is used in the case of a moving image. Of course, this should not be construed restrictively, and it is possible to use various data compression schemes.

The control section 120 controls the write/read section 134, and records the compressed image data from the compression processing section 109 onto the recording medium 135. In this way, the imaging apparatus 100 can shoot a subject's image, and record image data forming the subject's image onto the recording medium 135.

In the imaging apparatus 100, although will be described later in detail, the image data obtained by shooting as mentioned above can be managed by being stored on the recording medium 135 in the order of time series (in the order of shooting date and time) in corresponding folder units.

A folder can be generated in accordance with the purpose, such as for each subject or each event. In the imaging apparatus 100 according to the first embodiment, for example, a folder is formed for each shot event such as an entrance ceremony, a sports day, or a birthday party. Of course, it is also possible to move shot image data to a target folder later, for example.

The image data recorded on the recording medium 135 can be read by the write/read section 134 controlled by the control section 120. The image data read from the recording medium 135 is supplied to the decompression processing section 110 via the control section 120.

The decompression processing section 110 performs a decompression process on the image data supplied to the decompression processing section 110, in accordance with the data compression scheme used at the time of data compression, reconstructs the image data prior to data compression, and supplies the reconstructed data to the reducing/enlarging section 111.

The reducing/enlarging section 111 thins or interpolates the image data from the decompression processing section 110 in accordance with control by the control section 120, thereby enlarging or reducing an image formed by the image data.

In the case of image data for which neither enlargement nor reduction is necessary, the reducing/enlarging section 111 can be also controlled by the control section 120 so as not to perform a reducing process or an enlarging process with respect to supplied image data.

Then, from image data to be outputted, the reducing/enlarging section 111 generates the luminance signal Y and the chrominance signals Cb, Cr in a format for supply to the display processing section 105, and supplies the signals to the display processing section 105.

In the same way as when processing the image data from the image processing section 104, the display processing section 105 converts the image signals from the reducing/enlarging section 111 into image signals in a format for supply to the display section 106, and supplies the converted image signals to the display section 106.

Thus, an image based on image data recorded on the recording medium 135 can be displayed on the display screen of the display section 106. That is, the image data of a target image recorded on the recording medium 135 can be played back.

In this way, the imaging apparatus 100 according to the first embodiment can shoot a subject's image, and records the image onto the recording medium 135. In addition, the imaging apparatus 100 can also read and play back image data recorded on the recording medium 135, and display an image based on the image data on the display screen of the display section 106.

In addition, the display processing section 105 of the imaging apparatus 100 can perform forwarding/reversing of a display image in accordance with control by the control section 120. In the following description, forwarding/reversing of a display image will be sometimes referred to as scroll or screen forwarding.

As will be described later in detail, when a tracing operation is performed, the imaging apparatus 100 according to the first embodiment can start a scrolling process of a display image in accordance with the direction of the tracing operation.

Further, by keeping a finger or the like in contact with the operating surface of the touch panel 107 successively from the tracing operation, the scrolling process of a display image that has been started can be continued.

That is, by keeping the finger or the like in contact with the operating surface of the touch panel without releasing from the time when a tracing operation is performed, a process started in accordance with the initial tracing operation can be continued.

In this way, a display process executed in accordance with an initial operation can be continued for a time desired by each user, without performing frequent or complex operations.

[Configuration Example of Image Folder and Image File]

As mentioned above, in the imaging apparatus 100 according to this embodiment, image data obtained by shooting can be stored into an image folder on the recording medium 135, which is generated in accordance with a user's instruction, in the order of shooting date and time (in the order of time series according to the shooting date and time).

In this regard, as mentioned above, an image folder is generated for, for example, each shot event such as an entrance ceremony, a sports day, or a birthday party. Other than this, it is also possible, for example, to generate an image folder corresponding to a shooting date.

FIG. 2 is a diagram illustrating a layout example of an image folder generated on the recording medium 135 of the imaging apparatus 100. As shown in FIG. 2, an image folder has a folder name as identification information for identifying each holder. This folder name represents, for example, information corresponding to a shot event, such as an entrance ceremony, a sports day, or a birthday party, or information related to a shooting date such as the shooting year/month, or shooting year/month/day.

Each image folder has, as its header information, the creation date and time of the image folder, and other various kinds of metadata. Examples of metadata include notes information (character information) inputted by the user, in addition to information that can be automatically assigned in the imaging apparatus 100 such as the number of image files stored in the image folder. It is also possible to append other kinds of information as metadata.

An image folder stores the shooting date and time, the file name, and the address on the recording medium with respect to each of image files belonging to the image folder. Through such information in the image folder, it is possible to grasp what image files shot at what times are stored in the image folder, and where on the recording medium those image files are stored.

FIG. 3 is a layout example of an image file recorded on the recording medium 135 of the imaging apparatus 100. As shown in FIG. 3, an image file has a file name as identification information for identifying each image file. This file name is, for example, automatically assigned by the control section 120 at the time of shooting, and corresponds to each of the files names 1, 2, 3, and so on in the image folder shown in FIG. 2.

Each image file has the shooting date and time of image data stored in the image file (which corresponds to the creation date and time of the image file), and various kinds of metadata. Examples of metadata include notes information (character information) inputted by the user, in addition to information that can be automatically assigned in the imaging apparatus 100 such the size of the file. It is also possible to append other kinds of information as metadata.

Then, the image file stores image data forming a subject's image obtained by shooting, as main data.

In the imaging apparatus 100 according to the first embodiment, when the user does not generate a folder, for example, a folder corresponding to a shooting date is automatically generated, and image data obtained by shooting can be stored in this folder.

As mentioned above with reference to FIG. 2, an image folder generated in the imaging apparatus 100 manages image files of image data obtained by shooting, in the order of time series in accordance with the shooting date and time.

Therefore, on the basis of information in the image folder, the image data of the image file shown in FIG. 3 can be read and sequentially displayed in the forward direction of time, and can be read and sequentially displayed in the reverse direction of time.

[Displaying Manner of Scroll Display According to First Embodiment]

The imaging apparatus 100 according to the first embodiment allows forwarding/reversing of a display image (scrolling of the display image) to be performed by a tracing operation (drag operation or flick operation) on the operating surface of the touch panel 107.

As mentioned above, by keeping a user's finger or the like having performed a tracing operation in contact with (pointing on) the operating surface of the touch panel 107, scrolling of a display image started in accordance with the tracing operation can be continued.

FIG. 4 is a diagram illustrating the manner in which an image is displayed at the time of scrolling of a display image which is performed in the imaging apparatus 100 according to the first embodiment.

FIG. 4(a) shows that at the current point in time, image D is being displayed on a display screen 6G, and in the image folder to which this image D belongs, image C, image B, and image A are present before image D. Of course, there are also cases when image E, image F, and so on are present after image D.

FIG. 4(a) shows a case in which, as mentioned above, images are shot in the order of image A, B, C, D, and so on, and pieces of image data forming these images are stored in a predetermined image folder in the order of time series based on shooting date and time, and at the current point in time, image D is being displayed on the display screen 6G of the display section 106.

Now, suppose that, as shown in FIG. 4(a), the user has performed a tracing operation (drag operation or flick operation) with a finger, a stylus, or the like on the operating surface of the touch panel 107 of the display screen 6G on which image D is being displayed, from left to right as indicated by an arrow.

As mentioned above, upon accepting a contacting operation from the user, the touch panel 107 sequentially supplies coordinate data indicating a position on the operating surface contacted by the user's finger or the like, to the control section 120. On the basis of the coordinate data from the touch panel 107, the control section 120 determines what kind of operation has been made on the operating surface of the touch panel 107.

In the imaging apparatus 100, it is assumed that a tracing operation on the operating surface of the touch panel 107 in the case when an image is displayed on the entire surface of the display screen 6G as shown in FIG. 4(a) (tracing operation with respect to a display image) instructs scrolling of the display image.

Stated more specifically, in the imaging apparatus 100, it is assumed that a single tracing operation with respect to a display image is an operation of shifting the display image by one image's worth (scrolling by one image's worth) in the traced direction. In this regard, a single tracing operation means a series of operations from placing a finger or the like in contact with the operating surface, moving the finger or the like on the operating surface while keeping the contact, and then releasing the finger or the like from the operating surface.

In the case when, as shown in FIG. 4(a), an operation of tracing the operating surface of the touch panel 107 from right to left of the display screen 6G has been performed, on the basis of coordinate data from the touch panel 107, the control section 120 determines that scrolling of the display image in the reverse direction of time has been instructed.

Then, the control section 120 of the imaging apparatus 100 prepares the image data of an image to be displayed by scrolling in, for example, the RAM 123. As mentioned above, a single tracing operation with respect to a display image is an operation of shifting the display image by one image's worth in the traced direction.

Therefore, the image at the arrival point of scrolling is image C, and images to be scrolled are image D that is currently being displayed, and image C immediately preceding image D.

Accordingly, the control section 120 controls the write/read section 134, references information of an image folder to be displayed to read the image data of each of image D and image C to be scrolled, and stores the image data into the RAM 123.

If, for example, the image data of image D that is the image being currently displayed is present in the RAM 123, it is not necessary to read the image data of image D anew, and it is possible to use the image data of image D that is present in the RAM 123.

Thus, the image data of each of image D and image C to be scrolled is temporally stored in the RAM 123. Then, the control section 120 controls the decompression processing section 110, the reducing/enlarging section 111, and the display processing section 105, and starts the scrolling process of a display image.

Specifically, the control section 120 supplies image data to the decompression processing section 110 in the order of image D and then image C. In accordance with control by the control section 120, the decompression processing section 110 performs a decompression process on supplied image data that has undergone data compression, thereby reconstructing the original image prior to the data compression, and supplies this reconstructed image data to the reducing/enlarging section 111.

In this case, since it is not necessary to perform enlargement or reduction of the display image, the reducing/enlarging section 111 generates, from supplied image data, an image signal in a format for supply to the display processing section 105, and supplies this image signal to the display processing section 105.

In accordance with control by the control section 120, the display processing section 105 generates, from the supplied image signal, an image signal for displaying one screen's worth of image so as to move the image to be scrolled from the left to right of the display screen 6G, and supplies this image signal to the display section 106.

Thus, on the display screen of the display section 106, for example, as shown in FIG. 4(b), a part of image D as an image at the scroll start point, and a part of image C (image at the scroll arrival point) immediately preceding image D are displayed inside the display screen 6G, and both the images can be viewed.

Then, as mentioned above, a display process of an image (scrolling process of a display image) via the decompression processing section 110, the reducing/enlarging section 111, and the display processing section 105 is repeated with respect to the image data of each of image D and image C to be scrolled. Thus, an image can be displayed on the display screen 6G of the display section 106 while gradually scrolling the display image (while shifting the display position on the display screen).

In a case where decompressed image data can be held in, for example, the RAM 123, or a buffer memory or the like in the decompression processing section 110, the decompressed image data that has been held is used.

Thus, by omitting the process in the decompression processing section 110, and repeating the processes in the reducing/enlarging section 111 and the display processing section 105, scrolling of a display image accompanying a reducing process of the display image can be performed.

Then, once image C that is the image at the arrival point of scrolling is displayed on the entire surface of the display screen 6G as shown in FIG. 4(c), scrolling of the display image according to a single tracing operation ends.

However, when, as shown in FIG. 4(c), the user's finger or the like having performed the tracing operation is held in contact with the operating surface of the touch panel 107 as it is (when the pointing operation is being continued), the control section 120 continues the scrolling process of the display image.

Therefore, since the touch on the operating surface continues in the case of FIG. 4(*c*), the control section 120 sets image C and image B immediately preceding image C as images to be scrolled anew. Then, the control section 120 controls the write/read section 134 to read the image data of image B from the recording medium 135, and temporarily stores the image data in the RAM 123.

Thereafter, as mentioned above, the control section 120 controls the decompression processing section 110, the reducing/enlarging section 111, and the display processing section 105 to scroll from image C to image B as shown in FIG. 4(*d*).

Then, as shown in FIG. 4(*e*), when the user's finger or the like is released from the operating surface of the touch panel 107 after scrolling from image C to image B, and the contact with the operating surface which has been continued is cancelled, the control section 120 ends the scrolling process.

In this case, once image B is displayed on the display screen 6G of the display section 106 as shown in FIG. 4(*e*), scrolling of the display image ends.

In this way, in the case of the imaging apparatus 100 according to the first embodiment, the user can perform the series of scroll display of the display image from image D to image B, by simply performing a tracing operation and then continuing the contact of the finger or the like with the operating surface of the touch panel 107 as it is.

That is, scrolling of the display image through a plurality of screens can be performed in one action without performing a tracing operation a plurality of times with respect to the operating surface of the touch panel 107 attached to the display screen 6G.

The example shown in FIG. 4 is directed to the case when scrolling is performed from the state in which image D is being displayed, up to image B located two images before image D. However, the scrolling process can be further continued by continuing the contact of the finger or the like having performed the tracing operation with the operating surface of the touch panel 107.

In the case when scrolling is continued by continuing the contact of the finger or the like with the operating surface of the touch panel 107, if display of an image is changed too fast, it is difficult for the user to check the image that is being scrolled in a satisfactory manner.

Accordingly, when all of an image displayed in one screen has been changed over by scrolling, the scrolling process is stopped for a fixed time period, and after the new image is displayed for the fixed time period, the scrolling process is carried on (resumed).

That is, in the case of the example shown in FIG. 4, once the display is changed from image D to image C in FIG. 4(*c*), image C is displayed for a fixed time period to ensure that the user can recognize image C, and then scrolling to image B is started.

In this regard, in the case of the example shown in FIG. 4, since an image is displayed on the entire surface of the display screen 6G and does not become particularly difficult to view, the fixed time period for which scrolling of a display image is temporarily stopped (pause time for the display image after scrolling) is, for example, on the order of several hundred milliseconds to a second. Of course, the fixed time period is not limited to this, and can be set to various time periods.

The fixed time period for which scrolling of a display image is temporarily stopped (pause time for the display image after scrolling) can be also determined in accordance with the distance or time period of a tracing operation. If the distance of the tracing operation is long or the speed of the tracing operation is fast, in many cases, the conceivable reason is that the user wants to scroll a large amount of images.

Accordingly, the fixed time period for which scrolling of a display image is temporarily stopped can be set in accordance with the distance of a tracing operation, or the fixed time period for which scrolling of a display image is temporarily stopped can be set in accordance with the speed of a tracing operation.

For example, the possible range of the distance of a tracing operation can be divided into a plurality of ranges in advance, and the time period for which scrolling of a display image is temporarily stopped can be set to vary for each of the divided ranges. Likewise, the possible range of the speed of a tracing operation can be divided into a plurality of ranges in advance, and the time period for which scrolling of a display image is temporarily stopped can be set to vary for each of the divided ranges.

In addition, the fixed time period for which scrolling of a display image is temporarily stopped can be also set on the basis of both the distance and speed of a tracing operation. For example, it is possible to set the fixed time period to a short time period determined in advance in the case when the distance of a tracing operation is longer than a predetermined threshold and the speed of the tracing operation is faster than a predetermined threshold, or to set the fixed time period to a relatively long time period determined in advance in other cases.

In addition, it is also possible to set the fixed time period short irrespective of the distance of a tracing operation in the case when the speed of the tracing operation is faster than a predetermined threshold, or to set the fixed time period short irrespective of the speed of a tracing operation in the case when the distance of the tracing operation is longer than a predetermined threshold. Therefore, in cases other than these, the fixed time period is set long in the case when the distance of a tracing operation is short and the speed of the tracing operation is slow.

In this way, on the basis of one or both of the distance and speed of a tracing operation, the fixed time period for which scrolling of a display image is temporarily stopped (pause time for the display image after scrolling) can be controlled as appropriate.

In the case when the fixed time period for which scrolling of a display image is temporarily stopped (pause time for the display image after scrolling) is set short, the playback interval of one image is set small so that high-speed scroll display can be performed.

In addition, not only the fixed time period for which scrolling of a display image is temporarily stopped, but also the speed of the scrolling itself (the speed at which an image moves on the display screen) can be similarly changed.

The distance of a tracing operation means the length (distance) traced on the operating surface of the touch panel by performing the tracing operation. The speed of a tracing operation is obtained by dividing the distance of the tracing operation by the time period of the tracing operation (the time period for which a finger or the like is moved while being held in contact with the operating surface).

The control section 120 of the imaging apparatus 100 according to the first embodiment can detect the distance of a tracing operation on the basis of coordinate data from the touch panel 107 which changes in accordance with the tracing operation.

The control section 120 of the imaging apparatus 100 can also detect the time period from the start to end of a tracing operation as the time period of the tracing operation via the clock circuit 136. Specifically, the time period of movement from the point in time when supply of coordinate data from the touch panel 107 is started to the point in time when changing of the coordinate data that changes in accordance with a tracing operation ends, is detected as the time period of the tracing operation.

Thus, the control section 120 of the imaging apparatus 100 can calculate the speed of a tracing operation, from the distance of the tracing operation and the time period of the tracing operation which can be detected as mentioned above.

The example shown in FIG. 4 is directed to the case in which accumulated images are scrolled in the reverse direction of shooting date and time and displayed, by performing a tracing operation from left to right on the operating surface of the touch panel 107 on the display screen 6G.

Conversely, when a tracing operation is performed from right to left on the operating surface of the touch panel 107 on the display screen 6G, accumulated images can be scrolled in the forward direction of shooting date and time.

In this way, also in the case of scrolling accumulated images in the forward direction of shooting date and time for display, likewise, by keeping a finger or the like in contact with the operating surface of the touch panel 107 successively from a tracing operation, the scrolling in the forward direction of time can be continued.

[Details of Scrolling Process According to First Embodiment]

Figure 5:
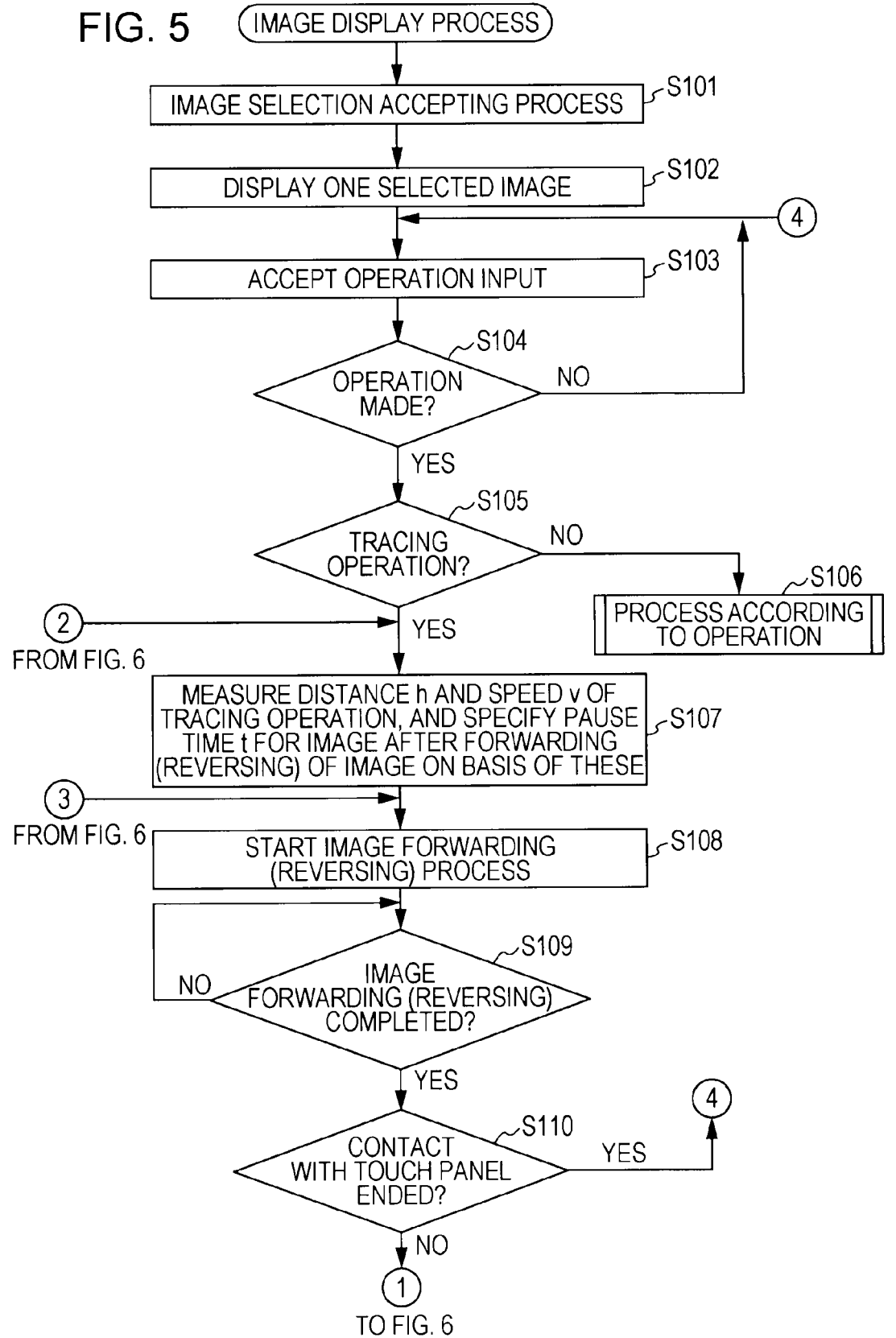
FIG. 5 is a flowchart illustrating a playback process of a shot image including a scrolling process which is performed in the imaging apparatus according to the first embodiment.
Figure 6:
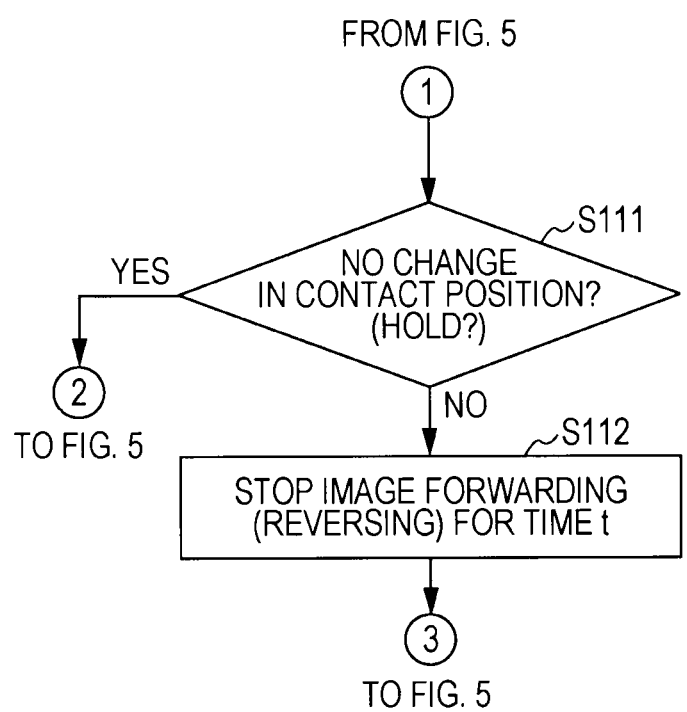
FIG. 6 is a flowchart continuing from FIG. 5.

Next, referring to the flowcharts in FIGS. 5 and 6, a description will be given of details of the scrolling process of a display image described with reference to FIG. 4, which is performed in the imaging apparatus 100 according to the first embodiment. FIGS. 5 and 6 are flowcharts illustrating a playback process of a shot image including a scrolling process which is performed in the imaging apparatus 100 according to the first embodiment.

The process shown in FIG. 5 is executed mainly by the control section 120 when, for example, a menu item called image playback process (playback process of a recorded image) is selected from a menu displayed on the display screen of the display section 106.

The menu is displayed on the display screen of the display section 106 by the controlling section 120 controlling the display processing section 105 and the like, when a predetermined operation such as a depressing operation on a menu key provided in the operating section 131 of the imaging apparatus 100 is performed.

Then, when the image playback process is selected from the menu, the control section 120 executes the processes shown in FIGS. 5 and 6, and first performs a process of accepting a selection input for selecting the first image to be displayed (step S101).

Specifically, in step S101, the control section 120 first displays a list of image folders and accepts a selection input, displays a list of images in image files belonging to a selected image folder, and accepts a selection input for selecting an image to be displayed in one screen.

In this regard, a list of images belonging to an image folder is, for example, a list of thumbnail images for images in each image file. Thumbnail image data for displaying a thumbnail image is, for example, created in advance on the basis of image data of each image file at appropriate timing after shooting, and although not shown in FIG. 3, is stored in each individual image file. Of course, the thumbnail image data may be created on the basis of image data of each image file and displayed at the time of displaying a thumbnail image.

Thereafter, the control section 120 displays the image selected in step S101 on the display screen 6G of the display section 106 (step S102).

Specifically, in step S102, the control section 120 grasps from which image file each of thumbnail images displayed in list form is read. Accordingly, the control section 120 identifies an image file having a selected thumbnail image, and controls the write/read section 134 to read image data from the identified image file.

Then, the control section 120 processes the read image data in the decompression processing section 110, the reducing/enlarging section 111, and the display processing section 105, and supplies the processed image data to the display section 106, thereby displaying the image selected by the user on the entire surface of the display screen 6G of the display section 106.

As mentioned above, the process in step S102 is a process of reading the image data of an image selected by the user, and fully displaying the image across the display screen 6G of the display section 106 (performing one-screen display of an image).

Thereafter, the control section 120 is made to accept an operation input from the user via the touch panel 107 and the operating section 131 (step S103), and determines whether or not an operation input from the user has been accepted (step S104). If it is determined in the determining process in step S104 that an operation input from the user has not been accepted, the control section 120 repeats the process from step S103 onwards.

If it is determined in the determining process in step S104 that an operation input from the user has been accepted, the control section 120 determines whether or not the accepted operation input is a tracing operation for performing scrolling of a display image (step S105).

If it is determined in the determining process in step S105 that the accepted operation input is not a tracing operation, the control section 120 executes a process according to the accepted operation input from the user (step S106). In step S106, for example, various kinds of process such as an enlarging process or reducing process of a display image, and a process of ending the image playback process are performed in accordance with the operation input.

If it is determined in the determining process in step S105 that the accepted operation input is a tracing operation, the control section 120 measures the distance h of the tracing operation and the speed v of the tracing operation, and specifies the pause time t for the display image after scrolling, on the basis of these pieces of information (step S107).

As mentioned above, the distance h of a tracing operation can be measured on the basis of coordinate data sequentially supplied from the touch panel 107. The speed of a tracing operation is found by dividing the measured distance of the tracing operation by the time period of the tracing operation.

In this regard, as mentioned above, the time period of a tracing operation can be grasped by measuring the time period from the start to end of the tracing operation, which can be grasped on the basis of coordinate data sequentially supplied from the touch panel 107, by the clock circuit 136.

Then, the control section 120 starts a process of scrolling one screen's worth of display image (forwarding process or reversing process of the display process) in accordance with the direction of the tracing operation (step S108). As mentioned above, the process in step S108 is a process of preparing image data necessary for display by reading the image data from a recording medium, and controlling each of the decompression processing section 110, the reducing/enlarging section 111, and the display processing section 105 to scroll the display image.

Thereafter, the control section 120 determines whether or not one screen's worth of scrolling has been finished (step S109). If it is determined that one screen's worth of scrolling has not been finished, one screen's worth of scrolling is carried on so as to repeat the process in step S109.

If it is determined in the determining process in step S109 that one screen's worth of scrolling has been finished, the control section 120 checks the presence/absence of coordinate data from the touch panel 107, and determines whether or not the contact with the operating surface of the touch panel 107 has been continuing (step S110).

This determining process in step S110 is a process of determining whether or not the contact of a user's finger or the like with the operating surface of the touch panel has been continuing successively since the tracing operation.

If it is determined in the determining process in step S110 that the contact of the finger or the like with the operating surface of the touch panel 107 has ended, it is determined that the user has ended the scrolling process, and the process from step S103 onwards is repeated. Thus, a new tracing operation or the like can be accepted.

If it is determined in the determining process in step S110 that the contact of the finger or the like with the operating surface of the touch panel 107 has not ended (has been continuing), it is determined that the user has been continuing the scrolling process, and the processing proceeds to the process in FIG. 6.

In this case, the control section 120 determines whether or not there has been no change in the contact position of the user's finger or the like held in contact with the operating surface of the touch panel 107 (step S111). If it is determined in the determining process in step S111 that there has been no change in the contact position of the finger or the like, the control section 120 pauses the display of a new image that is displayed on the display screen 6G after one screen's worth of scrolling, for the pause time t (step S112).

That is, the process in step S112 is a process of temporarily stopping the scrolling process so that a new image displayed after scrolling is paused for the pause time t. As mentioned above, the pause time t is the time specified in step S107.

After the process in step S112, the control section 120 repeats the process from step S108 onwards shown in FIG. 5 to perform the next one screen's worth of scrolling process. That is, the scrolling process is resumed, and scrolling of the display image is continuously performed.

If it is determined in the determining process in step S111 that there has been a change in the contact position of the finger or the like, the control section 120 determines that a new tracing operation has been performed, repeats the process from step S107 onwards shown in FIG. 5, and starts the scrolling process of a display image according to the new tracing operation.

In this case, the new tracing operation can be performed successively from the initial tracing operation. Therefore, forwarding/reversing of the display image can be performed successively with ease.

In this way, in the imaging apparatus 100 according to the first embodiment, scrolling of a display image is started by a tracing operation, and by keeping a finger or the like in contact with the operating surface of the touch panel 107 successively from the tracing operation, the scrolling process can be continued.

In addition, even the pause time t for the display image after scrolling is controlled appropriately in accordance with the distance or speed of the tracing operation, so that the display image can be scrolled at a speed intended by the user, without the scrolled display image becoming hard to view.

Incidentally, in the case when the contact with the touch panel 107 made successively from a tracing operation has continued for a certain time period or more, it can be determined that it is necessary for the user to perform a larger amount of scrolling.

Accordingly, in an imaging apparatus according to a second embodiment described next, in the case when the contact with the touch panel 107 made successively from a tracing operation has continued for a certain time period or more, the image display mode is switched over to allow for more efficient image display and scrolling.

[Second Embodiment]

Next, an imaging apparatus according to a second embodiment will be described. The imaging apparatus according to the second embodiment is also the imaging apparatus 100 configured as described with reference to FIG. 1. Thus, reference will be also made to FIG. 1 in the description of the imaging apparatus 100 according to the second embodiment as well.

In addition, in the imaging apparatus 100 according to the second embodiment as well, as described with reference to FIGS. 2 and 3, image data (still image data) obtained by shooting is managed for each folder and for each shooting date and time.

As in the case of the imaging apparatus according to the first embodiment mentioned above, in the imaging apparatus 100 according to the second embodiment as well, scrolling of a display image can be started in accordance with a tracing operation.

Then, when contact of a finger or the like with the touch panel 107 continues successively from the tracing operation, the scrolling process started in accordance with the tracing operation is continued. When the duration of the contact of the finger or the like with the touch panel 107 exceeds a fixed time period, the display mode is changed.

Thus, an image can be displayed and scrolled more efficiently, so that scrolling of a display image can be performed in a manner that meets the user's needs.

[Displaying Manner of Scroll Display According to Second Embodiment]

In the imaging apparatus 100 according to the second embodiment as well, as in the case of the imaging apparatus according to the first embodiment, a scrolling process of a display image can be started by a tracing operation on the operating surface of the touch panel 107.

In addition, by keeping the user's finger or the like having performed the tracing operation in contact with the operating surface of the touch panel 107, the scrolling process of the display image is continued. However, when the duration of this contact exceeds a fixed time period, the display mode is changed.

FIG. 7 is a diagram illustrating the manner in which an image is displayed at the time of scrolling of a display image which is performed in the imaging apparatus 100 according to the second embodiment. FIG. 7(a) shows that, as in the case of the first embodiment, at the current point in time, image D is being displayed on the display screen 6G.

In the image folder to which this image D belongs, a plurality of images including image C, image B, image A, image Z, image Y, image X, image W, image V, image U, image T, and so on are present before image D. Of course, there are also cases when image E, image F, and so on are present after image D.

In this way, images are shot in the order of image T, U, V, W, X, Y, Z, A, B, C, D, and so on, and pieces of image data forming these images are stored in a predetermined image folder in the order of time series based on shooting date and time.

Now, suppose that, as shown in FIG. 7(a), the user has performed a tracing operation (drag operation or flick operation) with a finger, a stylus, or the like on the operating surface of the touch panel 107 of the display screen 6G on which image D is being displayed, from left to right as indicated by an arrow.

As mentioned above, on the basis of coordinate data from the touch panel 107, the control section 120 determines what kind of operation has been made on the operating surface of the touch panel 107. In the imaging apparatus 100 according to the second embodiment as well, as in the case of the first embodiment, a single tracing operation with respect to a display image is an operation of shifting the display image by one image's worth (scrolling by one image's worth) in the traced direction.

In the case when, as shown in FIG. 7(a), an operation of tracing the operating surface of the touch panel 107 from right to left of the display screen 6G has been performed, on the basis of coordinate data from the touch panel 107, the control section 120 determines that scrolling of the display image in the reverse direction of time has been instructed.

As in the case of the imaging apparatus according to the first embodiment mentioned above, the control section 120 of the imaging apparatus 100 controls the write/read section 134, and prepares the image data of an image to be displayed by scrolling in, for example, the RAM 123.

Thereafter, as in the case of the imaging apparatus according to the first embodiment mentioned above, the control section 120 controls the decompression processing section 110, the reducing/enlarging section 111, and the display processing section 105, and starts a scrolling process of a display image.

Then, as mentioned above, a display process of an image (scrolling process of a display image) via the decompression processing section 110, the reducing/enlarging section 111, and the display processing section 105 is repeated with respect to the image data of each of image D and image C to be scrolled. Thus, an image can be displayed on the display screen 6G of the display section 106 while gradually scrolling the display image (while shifting the display position on the display screen).

Then, as shown in FIG. 7(b), when the user's finger or the like having performed the tracing operation is held in contact with the operating surface of the touch panel 107 as it is (when the pointing operation is being continued), the control section 120 continues the scrolling process of the display image.

That is, when the scrolling process is started, as in the case of the imaging apparatus according to the first embodiment mentioned above, first, the display image gradually changes from image D to image C, and when all of image C is displayed on the display screen 6G, image C is displayed for a fixed time period.

In this case, when the contact with the touch panel 107 continues, the control section 120 resumes scrolling, and changes the display image gradually from image C to image B as shown in FIG. 7(b). When all of image B is displayed on the display screen, image B is displayed for a fixed time period.

Then, when the contact with the touch panel 107 further continues, scrolling is resumed to display the next image. In this way, when the contact of a finger or the like with the touch panel 107 has been continuing successively since a tracing operation, scrolling of the display image is continued.

In the imaging apparatus 100 according to the second embodiment, when contact of a finger or the like with the touch panel 107 performed successively from a tracing operation has been continuing for a fixed time period or more, the display mode is changed so that the number of images displayed in one screen is increased, and scrolling is done a plurality of images at a time.

That is, when the time period of contact of a finger or the like with the operating surface of the touch panel 107 performed successively from a tracing operation exceeds threshold T that is determined in advance, the control section 120 changes the display mode so that the number of images displayed in one screen is five, and scrolling is done three images at a time.

For example, suppose a case where, from the state shown in FIG. 7(b), the contact time of a finger or the like with the operating surface of the touch panel 107 exceeds threshold T at the time when image B is displayed on the entire surface of the display screen 6G. In this case, the control section 120 of the imaging apparatus 100 according to the second embodiment changes the number of images displayed in one screen from one to five. That is, the display mode is changed to one for displaying five reduced images in one screen.

Therefore, after image B is displayed on the entire surface of the display screen 6G, five images located before image B, namely image A, image Z, image Y, image X, and image W become the images to be displayed. The control section 120 controls the write/read section 134 to read these five pieces of image data to be displayed, and temporarily stores the pieces of image data in the RAM 123.

Then, the control section 120 controls each of the decompression processing section 110, the reducing/enlarging section 111, and the display processing section 105 to perform a process of displaying five reduced images in one screen. That is, the control section 120 supplies the read image data to the decompression processing section 110.

The decompression processing section 110 performs a decompression process on supplied image data that has undergone data compression, reconstructing the original image prior to the data compression, and supplies this reconstructed image data to the reducing/enlarging section 111.

In accordance with control by the control section 120, the reducing/enlarging section 111 reduces the image data from the decompression processing section 110 to a predetermined size by a thinning process or the like. Then, from this reduced image data, the reducing/enlarging section 111 generates an image signal in a format for supply to the display processing section 105, and supplies this image signal to the display processing section 105.

As shown in FIG. 7(c), for example, from the image signal from the reducing/enlarging section 111, the display processing section 105 generates an image signal for displaying one screen's worth of display image including five reduced images, and supplies this image signal to the display section 106.

Thus, on the display screen 6G of the display section 106, as shown in FIG. 7(c), an image having five reduced images, image A, image Z, image Y, image X, and image W, is displayed.

Then, when contact of a user's finger or the like with the operating section of the touch panel 107 is further continuing, the control section 120 carries on with the scrolling process of the display image in the manner of displaying five reduced images in one screen.

In the case of the imaging apparatus 100 according to the second embodiment, the display mode is such that five reduced images are displayed in one screen, and the control section 120 performs processing so that three images' worth of scrolling is done at a time for each one screen.

That is, to scroll the display image from the state in FIG. 7(c), the control section 120 reads the image data of each of image V, image U, and image T that are three images located before image W.

Then, in addition to the image data of each of image X and image W which has been already read, as mentioned above, the control section 120 processes the newly read image data of each of image V, image U, and image T via the decompression processing section 110, the reducing/enlarging section 111, and the display processing section 105 and displays the image data.

Thus, as shown in FIG. 7(d), the display image can be further scrolled back in time by three images' worth from the state shown in FIG. 7(c) and displayed. Then, while contact of a finger or the like with the operating section of the touch panel 107 continues, likewise, a scrolling process is performed so as to shift the displayed image by three images' worth at a time.

In this example, for the simplicity of description, necessary image data is read from the recording medium 135, and this image is displayed after undergoing a decompression process and also a reducing process. However, this should not be construed restrictively.

As for the image data of images to be previously displayed, image data after a decompression process is held, and this image data can be used. In addition, when thumbnail data forming a thumbnail image exists in an image file, by using this thumbnail data, image display can be performed in the manner as shown in FIG. 7(c) and FIG. 7(d) without performing a decompression process and a reducing process.

Then, when a target image is displayed, and the user releases a finger or the like from the operating surface of the touch panel 107, it is determined that ending of the scrolling process has been instructed, and the control section 120 of the imaging apparatus 100 ends the scrolling process.

Then, when in the state shown in FIG. 7(d), the control section 120 performs a process of displaying the image located at the center of the display screen 6G (image V in the case of FIG. 7(d)), on the entire surface of the display screen 6G.

In this case, the control section 120 processes the image data of image V via the decompression processing section 110, the reducing/enlarging section 111, and the display processing section 105, and displays image V on the entire surface of the display screen 6G of the display section 106 as shown in FIG. 7(e).

Thereafter, by performing a tracing operation (operation from placing a finger or the like in contact with the operating surface of the touch panel 107 to releasing the finger or the like from the operating surface) one more time, one image's worth of scrolling or the like is performed, so that a target image can be displayed on the entire surface of the display screen 6G.

The example shown in FIG. 7 is directed to the case in which accumulated images are scrolled in the reverse direction of shooting date and time for display, by performing a tracing operation from left to right on the operating surface of the touch panel 107 on the display screen 6G.

Conversely, when a tracing operation is performed from right to left on the operating surface of the touch panel 107 on the display screen 6G, accumulated images can be scrolled in the forward direction of shooting date and time for display, in the manner described with reference to FIG. 7.

In this way, also in the case of scrolling accumulated images in the forward direction of shooting date and time for display, likewise, by keeping a finger or the like in contact with the operating surface of the touch panel 107 successively from a tracing operation, the scrolling in the forward direction of time can be continued.

Then, when the contact time of the finger or the like with the operating surface of the touch panel 107 exceeds a predetermined value, in the same manner as in the above-mentioned case, scrolling can be performed in the forward direction of time in the manner of displaying five reduced images in one screen.

In this way, in the imaging apparatus 100 according to the second embodiment, when contact of a finger or the like with the operating surface of the touch panel 107 performed successively from a tracing operation has continued for a fixed time period or more, the display mode is changed so that more images can be displayed in one screen. Then, the display image can be scrolled in the state with a plurality of images displayed in one screen.

[Details of Scrolling Process According to Second Embodiment]

Figure 8:
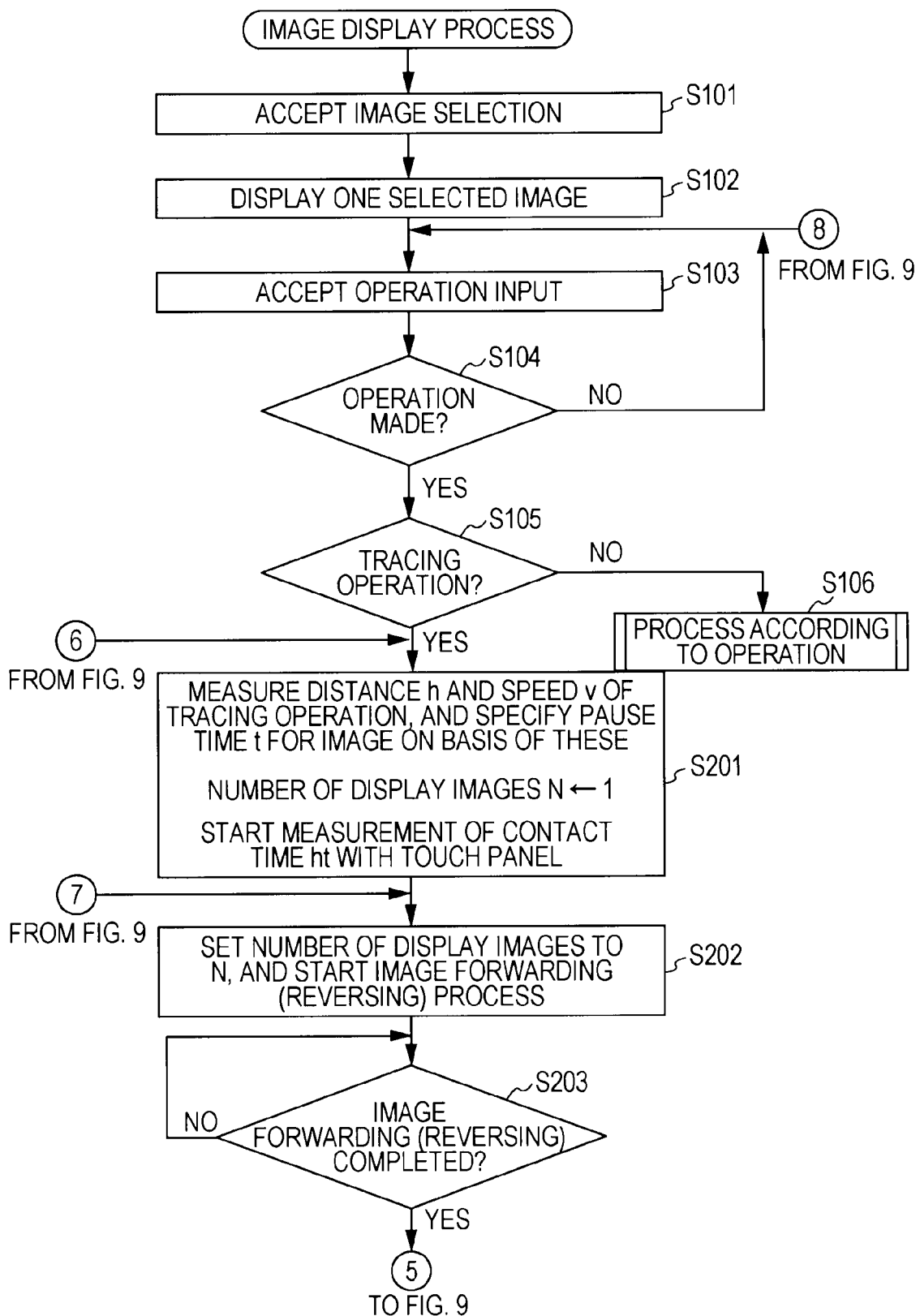
FIG. 8 is a flowchart illustrating a playback process of a shot image including a scrolling process which is performed in the imaging apparatus according to the second embodiment.
Figure 9:
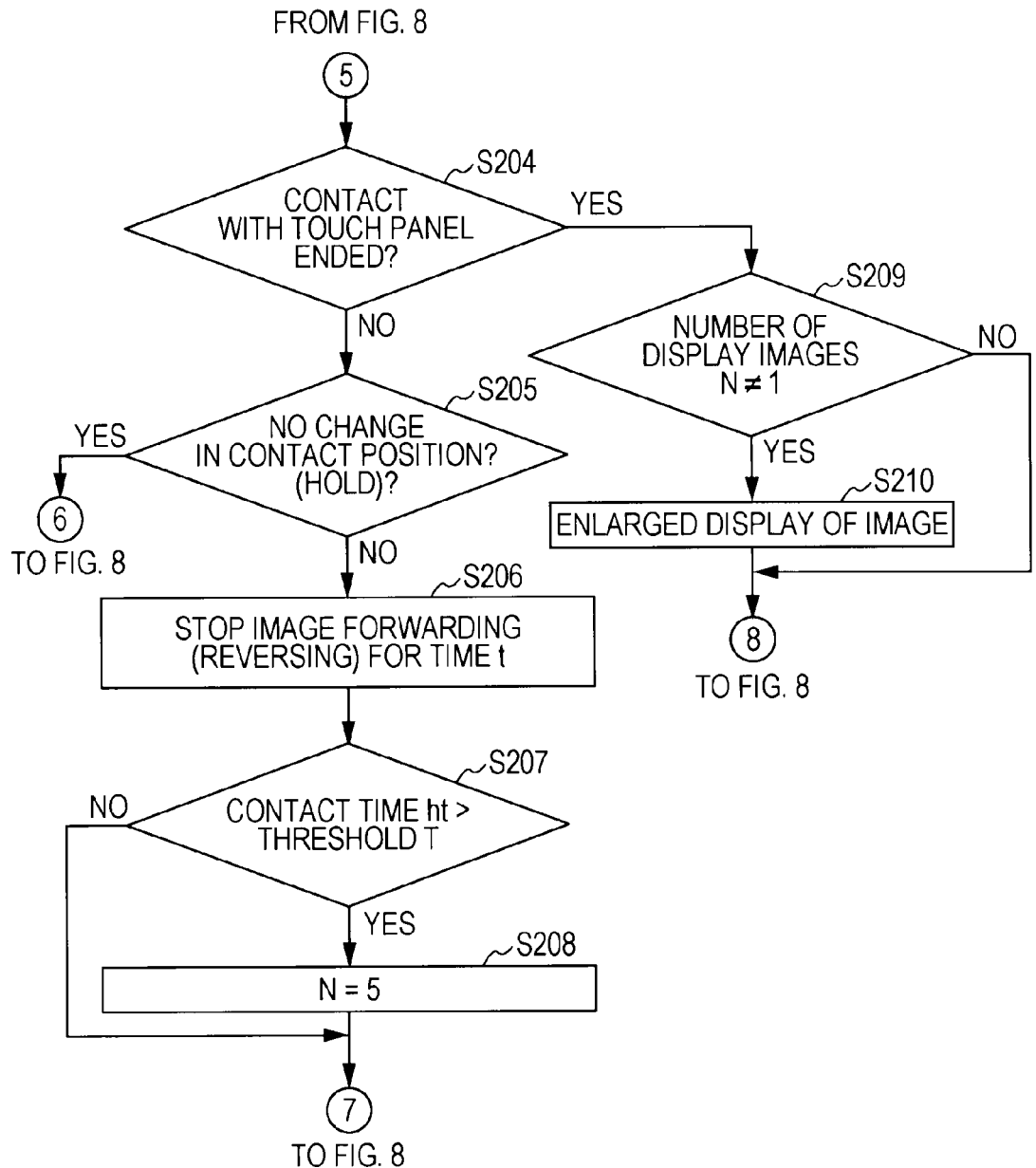
FIG. 9 is a flowchart continuing from FIG. 8.

Next, referring to the flowcharts in FIGS. 8 and 9, a description will be given of details of the scrolling process of a display image described with reference to FIG. 7, which is performed in the imaging apparatus 100 according to the second embodiment. FIGS. 8 and 9 are flowcharts illustrating a playback process of a shot image including a scrolling process which is performed in the imaging apparatus 100 according to the second embodiment.

As in the case of the image playback process according to the first embodiment shown in FIGS. 5 and 6, the process shown in FIGS. 8 and 9 is executed mainly by the control section 120 when a menu item called image playback process (playback process of a recorded image) is selected from a menu displayed on the display screen of the display section 106.

The process shown in FIGS. 8 and 9 is also performed basically in the same way as the image playback process in the imaging apparatus according to the first embodiment described with reference to FIGS. 5 and 6. Thus, in the flowcharts shown in FIGS. 8 and 9, the same reference numerals are assigned to those steps in which the same process as the process in the flowcharts shown in FIGS. 5 and 6 is performed, and detailed description of those portions is omitted to avoid repetition.

When the image playback process is selected in the imaging apparatus 100 according to the second embodiment, the control section 120 executes the process shown in FIGS. 7 and 8. Then, the control section 120 proceeds with the process in the same way as in the case of the imaging apparatus according to the first embodiment mentioned above.

That is, the control section 120 proceeds with the process in the order of an image selection accepting process (step S101), a display process of one selected image (step S102), accepting of an operation input (step S103), determination of the presence/absence of an operation input (step S104), and then determination of whether or not the operation is a tracing operation (step S105).

If it is determined in the determining process in step S105 that an accepted operation input is not a tracing operation, the control section 120 executes a process according to the accepted operation input (step S106).

If it is determined in the determining process in step S105 that an accepted operation input is a tracing operation, the control section 120 performs pre-processing for executing a scrolling process (step S201).

That is, in step S201, as in the process of step S107 according to the first embodiment shown in FIG. 5, the control section 120 measures the distance h of the tracing operation and the speed v of the tracing operation, and specifies the pause time t for the display image after scrolling on the basis of these pieces of information.

Further, in step S201, the control section 120 sets a variable N, which indicates the number of images displayed in one screen, to a value "1", and then starts measurement of the contact time ht of the finger or the like with the touch panel 107 continuing from the tracing operation, via the clock circuit 136.

Then, in accordance with the direction of the tracing operation, the control section 120 starts a process of scrolling the display image by one screen's worth, in the manner of displaying N images in one screen (forwarding process or reversing process of the display image) (step S202).

As mentioned above, the process in step S202 is a process of preparing image data necessary for display by reading the image data from a recording medium, and controlling each of the decompression processing section 110, the reducing/enlarging section 111, and the display processing section 105 to scroll the display image.

In the process in step S202, as shown in FIGS. 7(a) and FIG. 7(b), immediately after the tracing operation, scrolling is performed in the manner of one image in one screen. Then, in the process in step S202, as will be described later, when the contact time of a finger or the like with the operating surface of the touch panel 107 exceeds threshold T, scrolling is performed in the manner of five images in one screen as shown in FIG. 7(a) and FIG. 7(b).

Thereafter, the control section 120 determines whether or not one screen's worth (one screen's worth displaying N images) of scrolling has been finished (step S203), and if it is determined that one screen's worth of scrolling has not been finished, the control section 120 carries on with one screen's worth of scrolling so as to repeat the process in step S203.

If it is determined in the determining process in step S203 that one screen's worth of scrolling has been finished, the processing proceeds to the process shown in FIG. 9. Then, the control section 120 checks the presence/absence of coordinate data from the touch panel 107, and determines whether or not the contact with the operating surface of the touch panel 107 has been continuing (step S204).

That is, the determining process in step S204 is a process of determining whether or not the contact of a user's finger or the like with the operating surface of the touch panel has been continuing successively since the tracing operation.

If it is determined in the determining process in step S204 that the contact of the finger or the like with the operating surface of the touch panel 107 has not ended (has been continuing), the control section 120 determines whether or not there has been no change in the contact position of the user's finger or the like held in contact with the operating surface of the touch panel 107 (step S205).

If it is determined in the determining process in step S205 that there has been no change in the contact position of the finger or the like, the control section 120 pauses the display of a new image that is displayed on the display screen 6G after one screen's worth of scrolling, for the pause time t (step S206).

That is, the process in step S206 is a process of temporarily stopping the scrolling process so that a new image displayed after scrolling is paused for the pause time t. As mentioned above, the pause time t is the time specified in step S201.

Then, the control section 120 determines whether or not the contact time (duration of contact) ht of the contact of the user's finger or the like with the operating surface of the touch panel 107 which has been continued since the tracing operation has exceeded threshold T (step S207).

If it is determined in step S207 that the contact time ht has exceeded threshold T, the control section 120 sets the number of display images N displayed in one screen to a value "5", and changes the display mode (step S208). If it is determined in step S207 that the contact time ht has not exceeded threshold T, the control section 120 does not change the number of display images N displayed in one screen.

Then, after the process in step S208, or if it is determined in step S207 that the contact time ht has not exceeded threshold T, the control section 120 repeats the process shown in FIG. 8 from the process in step S202 onwards.

Thus, when the number of display images N displayed in one screen is changed to a value "5", as shown in FIG. 7(c) and FIG. 7(d), the control section 120 changes the display mode, and carries on with the scrolling process in the manner of displaying five reduced images in one screen.

When the value of the number of display images N displayed in one screen remains "1", as shown in FIG. 7(a) and FIG. 7(b), the control section 120 carries on with the scrolling process in the manner of displaying one image in one screen.

If it is determined in the determining process in step S205 that there has been a change in the contact position of the finger or the like, the control section 120 determines that a new tracing operation has been performed, repeats the process shown in FIG. 8 from the process in step S201 onwards, and starts the scrolling process of a display image according to the new tracing operation.

If it is determined in the determining process in step S204 that the contact of a finger or the like with the operating surface of the touch panel 107 has ended, the control section 120 determines whether or not the value of the number of display images N displayed in one screen is "1" (step S209).

If it is determined in the determining process in step S209 that the value of the number of display images N displayed in one screen is not "1", the display mode is changed, and images are displayed in the manner shown in FIG. 7(c) and FIG. 7(d).

Thus, as described with reference to FIG. 7(e), the control section 120 performs a process of enlarging the image displayed at the center of the display screen 6G, and displaying the image on the entire surface of the display screen 6G (step S210). Thereafter, the control section 120 repeats the process shown in FIG. 8 from the process in step S103 onwards, thereby making it possible to accept a new tracing operation or the like.

If it is determined in the determining process in step S209 that the value of the number of display images N displayed in one screen is "1", it can be determined that it is unnecessary to perform an enlarging process of an image. In this case, the control section 120 directly repeats the process shown in FIG. 8 from the process in step S103 onwards, thereby making it possible to accept a new tracing operation or the like.

In this way, in the imaging apparatus 100 according to the second embodiment, the display mode is changed in accordance with the contact time of a finger or the like with the operating surface of the touch panel 107 successively since a tracing operation, so that the scrolling process of a display image can be performed in the manner of display intended by the user.

[Modification of Second Embodiment]

Figure 10:
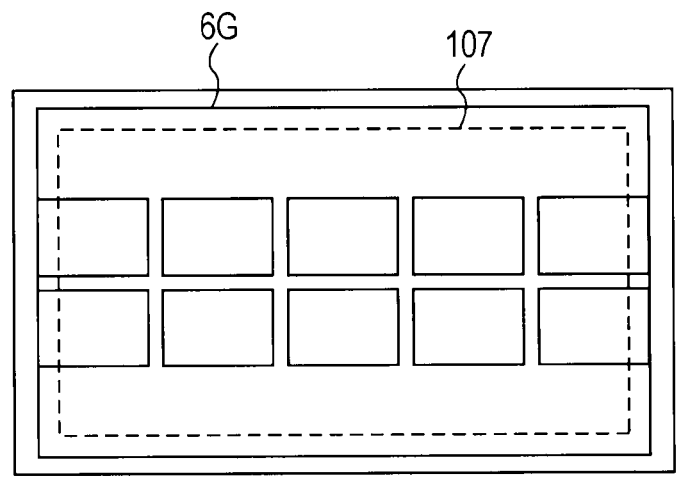
FIG. 10 is a diagram illustrating a display example in another display mode.
Figure 11:
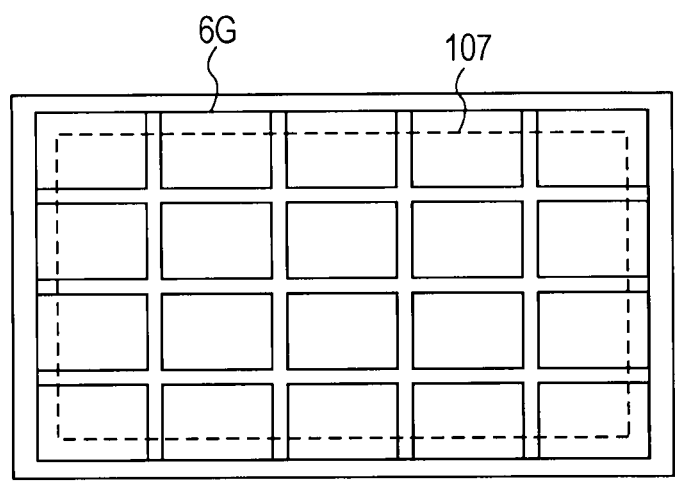
FIG. 11 is a diagram illustrating a display example in another display mode.
Figure 12:
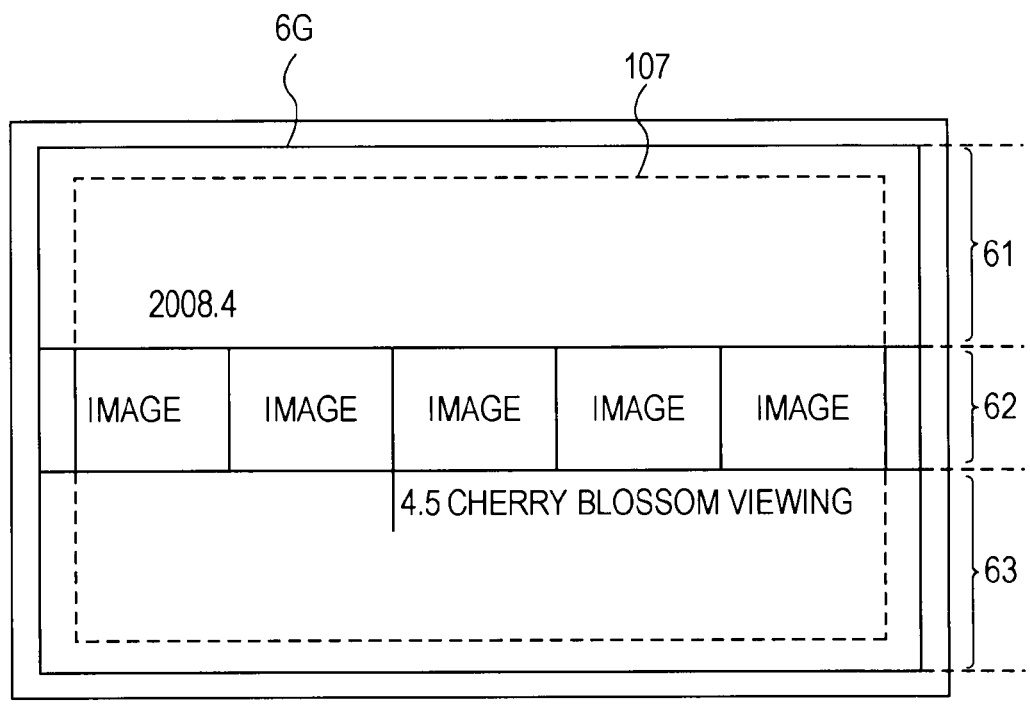
FIG. 12 is a diagram illustrating a display example in another display mode.

The second embodiment is directed to the case in which, as described with reference to FIG. 7, display of one image in one screen (first display mode) and display of five images in one screen (second display mode) are switched between each other. However, this should not be construed restrictively. FIGS. 10 to 12 are diagrams illustrating an example of display in a different display mode.

The number of display images N displayed in one screen can be set to an appropriate value not smaller than "2". For example, by setting the number of display images N displayed in one screen to "10", as shown in FIG. 10, display of 10 images in one screen can be also performed.

In addition, it is of course possible to perform so-called matrix display of images in which a large number of reduced images are displayed on the entire surface of the display screen 6G.

The second embodiment mentioned above is directed to the case in which scrolling is done in units of three images. However, this should not be construed restrictively. The unit of scrolling process can be set to any appropriate number not larger than the number of display images N displayed in one screen.

For example, in the case of the second display mode for displaying five images in one screen, the unit of scrolling can be set within a range of one to five images. In this way, an image scrolling process can be performed without causing occurrence of an image that becomes no longer displayed due to the scrolling process.

In addition, as mentioned above, how many reduced images are scrolled at a time (the unit of images to be scrolled) may be determined on the basis of one or both of the distance and speed of a tracing operation. For example, the unit of images to be scrolled can be made larger if the distance or speed of a tracing operation is larger than a fixed value, and the unit of images to be scrolled can be made smaller in other cases.

It is also possible to make the unit of images to be scrolled larger if each of the distance and speed of a tracing operation is larger than a threshold that is determined for each of such distance and speed, and to make the unit of images to be scrolled smaller in other cases.

It is also possible to set the range of the distance or speed of a tracing operation, and vary the unit of images to be scrolled for each such range.

As shown in FIG. 12, it is also possible to perform image display including not only reduced images but also display areas for date information and event information which represent information related to displayed images. In FIG. 12, the display screen 6G is divided into three display areas with respect to the vertical direction.

In the case of the example shown in FIG. 12, the top row of the display screen 6G is a date area 61, the middle row is an image area 62, and the bottom row is an event area 63.

The date area 61 is a part that displays the shooting year/month of a displayed image. The image area 62 is a part that displays reduced images. The event area 63 is a part that displays the folder name of an image folder to which the displayed image belongs, event name information stored as metadata in the image folder, or the like.

Then, each image folder described with reference to FIG. 2 is arranged in the order of the creation date and time of the image folder or in the order of the shooting years/months/days of image files belonging to the image folder in advance to allow its management.

Then, by making available the display mode for performing the display shown in FIG. 12, shot images can be displayed in the manner shown in FIG. 12 for each shooting year/month and for each event (for each image folder).

In this case, image scrolling can be performed while also referring to such information as the year/month information displayed in the date area 61, or the event name (image folder name) displayed in the event area 63.

In the case of the display mode for performing the display shown in FIG. 12, for example, by performing a tracing operation on the date area 61, the display can be changed so as to scroll through shooting year/month so that images in an image folder belonging to the changed shooting year/month are displayed.

In addition, by performing a tracing operation on the event area 63, the display can be changed so as to scroll through image folders so that images in an image folder belonging to the changed event are displayed.

Of course, it is also possible to scroll through display images by performing a tracing operation on the image area 62.

In this way, as available display modes, display modes for performing various manners of display can be used, such as a mode which not only simply varies the number of reduced images displayed in one screen but also displays information related to a displayed image together with reduced images.

No matter what kind of display is performed, basically, the display can be performed by the control section 120 controlling the decompression processing section 110, the reducing/enlarging section 111, and the display processing section 105. As for information other than images obtained by shooting, such information can be acquired from an image folder, an image file, the ROM 122, the clock circuit 136, or the like by the control section 120, and displayed after being processed in the reducing/enlarging section 111 or the display processing section 105.

The imaging apparatus according to each of the first and second embodiments mentioned above uses a tracing operation on the touch panel 107 as an operation for starting an image scrolling process. Then, the scrolling process is continued while the contact of a finger or the like with the operating surface of the touch panel 107 continues successively from the tracing operation. However, this should not be construed restrictively.

Several other effective embodiments can be implemented from the viewpoint of performing some operation on the operating surface of the touch panel 107 to give some change to the image being displayed (played back) and then holding this operation to continue the change to the image. Hereinbelow, third and fourth embodiments will be described.

[Third Embodiment]

Next, an imaging apparatus according to a third embodiment will be described. The imaging apparatus according to the third embodiment is also the imaging apparatus 100 configured as described with reference to FIG. 1. Thus, reference will be also made to FIG. 1 in the description of the imaging apparatus 100 according to the third embodiment as well.

In addition, in the imaging apparatus 100 according to the third embodiment as well, as described with reference to FIGS. 2 and 3, image data (still image data) obtained by shooting is managed for each folder and for each shooting date and time.

In the imaging apparatus 100 according to the third embodiment, when an image is being displayed on the display screen 6G, the displayed image can be enlarged or reduced by performing a pinch operation on the touch panel 107.

Then, when the user keeps a finger or the like in contact with the operating surface of the touch panel 107 successively from the pinch operation, the enlarging process or reducing process of the image started in accordance with the pinch operation can be continued.

For the simplicity of description, the following description will be mainly directed to the case of enlarging a display image.

[Manner of Enlarged Display of Display Image According to Third Embodiment]

Figure 13:
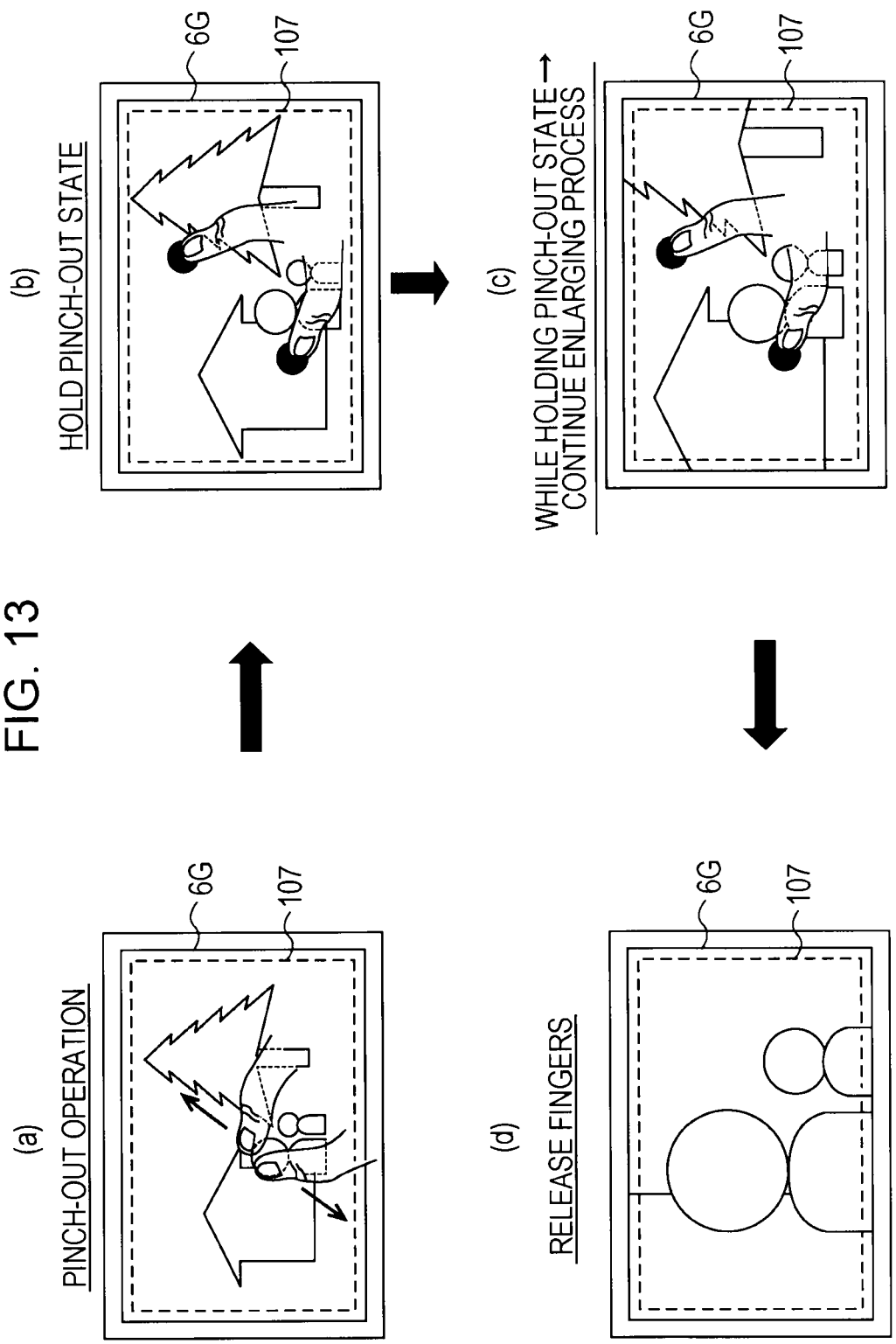
FIG. 13 is a diagram illustrating the manner in which an image is displayed at the time of an enlarging process of a display image which is performed in an imaging apparatus according to a third embodiment.

FIG. 13 is a diagram illustrating the manner in which an image is displayed at the time of an enlarging process of a display image which is performed in the imaging apparatus 100 according to the third embodiment.

Suppose a case where, as shown in FIG. 13, when an image is being displayed on the display screen 6G, a pinch-out operation is performed in which user's two fingers that are closed together are placed in contact with the operating surface of the touch panel 107 simultaneously, and then the two fingers are spread apart as indicated by arrows.

As mentioned above, the touch panel 107 can detect each of operations simultaneously performed in a plurality of locations on the operating surface, and output coordinate data indicating each of the contact positions.

In addition, while a finger or a stylus is held in contact with the touch panel 107 by the user, the touch panel 107 can also detect the contact position successively at each predetermined timing, and output coordinate data indicating the contact position.

Therefore, when the user performs an operation of spreading apart the fingers that are held in contact with adjacent positions on the operating surface of the touch panel 107, the control section 120 of the imaging apparatus 100 can detect that a pinch-out operation has been performed, by analyzing coordinate data from the touch panel 107.

The control section 120 of the imaging apparatus 100 according to the third embodiment determines the pinch-out operation as an operation for instructing enlarging of a display image. Then, the control section 120 controls the reducing/enlarging section 111 and the display processing section 105, and starts a process of enlarging the display image and displaying the display image again (enlarging process of the display image).

Specifically, image data which is the image data of an image to be displayed and which has undergone a decompression process in the decompression processing section 110 is enlarged in the reducing/enlarging section 111 by performing an interpolation process on the image data or the like. Then, from the enlarged image data, the reducing/enlarging section 111 generates an image signal in a format for supply to the display processing section 105, and supplies this image signal to the display processing section 105.

From the image signal from the reducing/enlarging section 111, the display processing section 105 generates an image signal to be supplied to the display section 106, and supplies this image signal to the display section 106. Thus, as shown in FIG. 13(b), an image that is enlarged from the state shown in FIG. 13(a) can be displayed on the display screen 6G of the display section 106.

Then, as shown in FIG. 13(b), the user's fingers with which the pinch-out operation has been performed on the operating surface of the touch panel 107 are held in contact with the operating surface of the touch panel 107 as they are.

In this case, coordinate data is continuously supplied to the control section 120 from the touch panel 107, and the control section 120 can determine that the pinch-out operation has been continued as it is (the pinch-out operation is held).

Then, upon determining that the pinch-out operation has been continued, the control section 120 continues the enlarging process of the display image. That is, the control section 120 controls the reducing/enlarging section 111 and the display processing section 105 and, as mentioned above, performs a process of further enlarging the image to be displayed and displaying the image.

Thus, as shown in FIG. 13(c) and FIG. 13(d), the enlarging process of the display image can be performed continuously while the pinch-out operation is continued. Then, when the user releases the fingers from the operating surface of the touch panel 107, coordinate data is no longer supplied from the touch panel 107. Thus, the control section 120 determines that the pinch-out operation has ended, and ends the enlarging process of the display image.

Thus, by performing a pinch-out operation and continuing the pinch-out operation, the user can gradually enlarge the image shown in FIG. 13(a) to the state shown in FIG. 13(d) for display.

When an enlarged image is being displayed on the display screen 6G as shown in FIG. 13(d), a reducing process of the display image can be performed by performing a pinch-in operation on the operating surface of the touch panel.

Then, when the pinch-in operation is maintained without releasing the user's fingers having performed the pinch-in operation from the operating surface of the touch panel, the reducing process of the image can be performed in the order of FIG. 13(d), FIG. 13(c), FIG. 13(b), and then FIG. 13(a).

In this way, in the imaging apparatus 100 according to the third embodiment, by performing a pinch-out operation continuously, the enlarging process of an image started in accordance with the pinch-out operation can be performed continuously.

Likewise, in the imaging apparatus 100 according to the third embodiment, by performing a pinch-in operation continuously, the reducing process of an image started in accordance with the pinch-in operation can be performed continuously.

[Details of Enlarged Display/Reduced Display Process of Image According to Third Embodiment]

Figure 14:
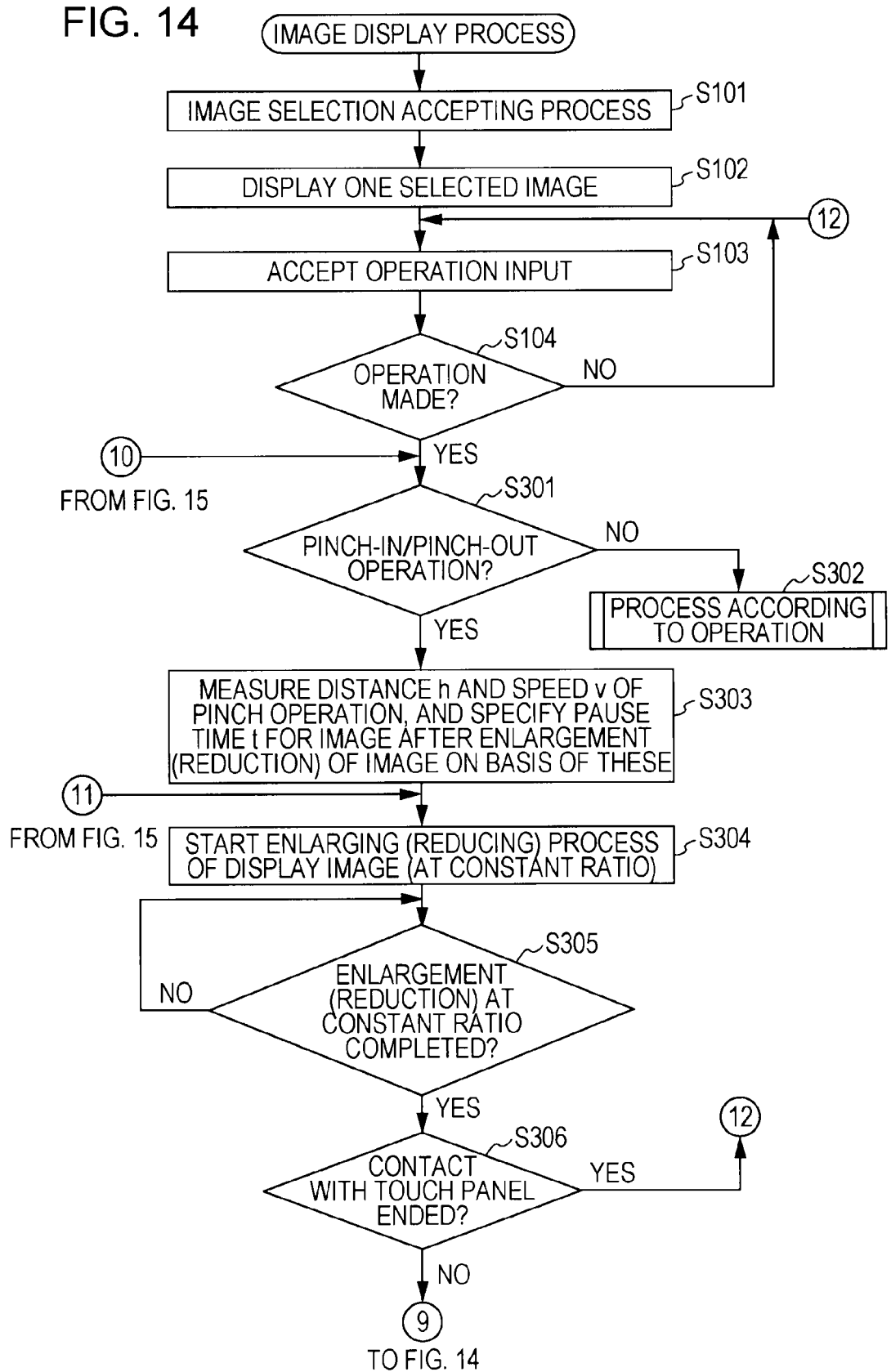
FIG. 14 is a flowchart illustrating a playback process of a shot image including an enlarged display/reduced display process of a display image which is performed in the imaging apparatus according to the third embodiment.
Figure 15:
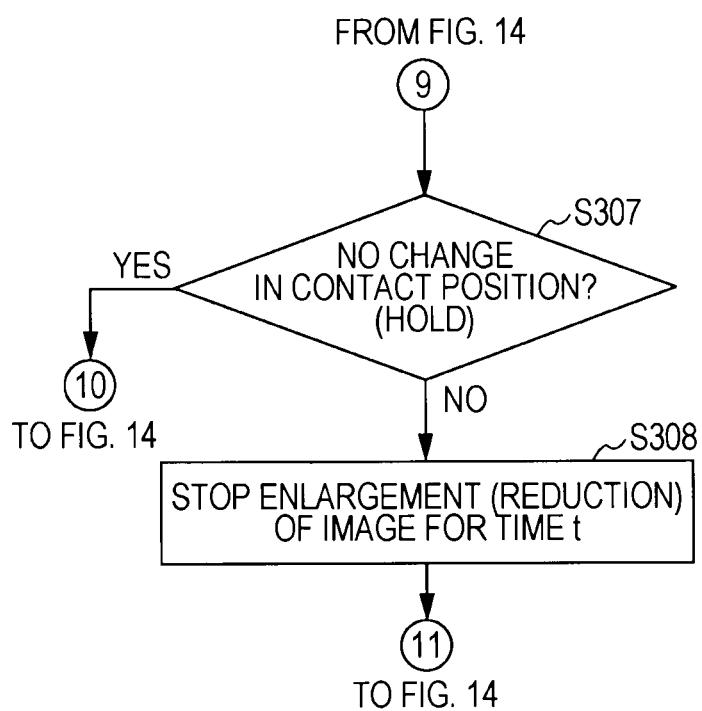
FIG. 15 is a flowchart continuing from FIG. 14.

Next, referring to the flowcharts in FIGS. 14 and 15, a description will be given of the enlarged display/reduced display process of a display image described with reference to FIG. 13, which is performed in the imaging apparatus 100 according to the third embodiment. FIGS. 14 and 15 are flowcharts illustrating a playback process of a shot image including an enlarged display/reduced display process of a display image which is performed in the imaging apparatus 100 according to the third embodiment.

As in the case of the image playback process according to the first embodiment shown in FIGS. 5 and 6, the process shown in FIGS. 14 and 15 is executed mainly by the control section 120 when a menu item called image playback process (playback process of a recorded image) is selected from a menu displayed on the display screen of the display section 106.

The process shown in FIGS. 14 and 15 is also performed basically in the same way as the image playback process in the imaging apparatus according to the first embodiment described with reference to FIGS. 5 and 6. Thus, in the flowcharts shown in FIGS. 14 and 15, the same reference numerals are assigned to those steps in which the same process as the process in the flowcharts shown in FIGS. 5 and 6 is performed, and detailed description of those portions is omitted to avoid repetition.

When the image playback process is selected in the imaging apparatus 100 according to the third embodiment, the control section 120 executes the process shown in FIGS. 14 and 15. Then, the control section 120 proceeds with the process in the same way as in the case of the imaging apparatus according to the first embodiment mentioned above.

That is, the control section 120 proceeds with the process in the order of an image selection accepting process (step S101), a display process of one selected image (step S102), accepting of an operation input (step S103), and then determination of the presence/absence of an operation input (step S104).

If it is determined in the determining process in step S104 that an operation input from the user has been accepted, the control section 120 determines whether or not the accepted operation input is a pinch operation (step S301).

If it is determined in the determining process in step S301 that the accepted operation input is not a pinch operation, the control section 120 executes a process according to the accepted operation input from the user (step S302). In step S302, for example, various kinds of process such as a scrolling process of an image, and a process of ending the image playback process are performed in accordance with the operation input.

If it is determined in the determining process in step S301 that the accepted operation input is a pinch operation, the control section 120 measures the distance h of the pinch operation and the speed v of the pinch operation, and specifies the pause time t for the display image on the basis of these pieces of information (step S303)

As will be described later, the process in step S303 is a process of specifying the time t for which, after finishing an enlarging/reducing process of a display image at a constant ratio determined in advance, the processed display image is displayed as it is.

As mentioned above, the distance h of a pinch operation can be measured from the coordinates of the start point and end point of movement of a user's finger or the like according to the pinch operation, on the basis of coordinate data sequentially supplied from the touch panel 107. The speed of a pinch operation can be found by dividing the measured distance of the pinch operation by the time period of the pinch operation. In this regard, the time period of the pinch operation can be grasped by measuring the time period from the start to end of movement of the user's finger or the like according to the pinch operation.

Thereafter, the control section 120 controls the reducing/enlarging section 111 and the display processing section 105, and starts a process of enlarging or reducing a display image at a constant ratio for display (step S304). That is, in step S304, an enlarging process is performed in the case of a pinch-out operation, and a reducing process is performed in the case of a pinch-in operation.

Thereafter, the control section 120 determines whether or not the process of enlarging or reducing a display image at a constant ratio for display has been finished (step S305). If it is determined that the process has not been finished, the control section 120 carries on with the process of enlarging or reducing a display image at a constant ratio so as to repeat the process in step S305.

If it is determined in the determining process in step S305 that the process of enlarging or reducing a display image at a constant ratio has been finished, the control section 120 checks the presence/absence of coordinate data from the touch panel 107, and determines whether or not the contact with the operating surface of the touch panel 107 has been continuing (step S306).

That is, the determining process in step S306 is a process of determining whether or not the contact of the user's finger or the like with the operating surface of the touch panel has been continuing successively since the pinch operation.

If it is determined in the determining process in step S306 that the contact of the finger or the like with the operating surface of the touch panel 107 has ended, it is determined that the user has ended the enlarging process or reducing process of the display image, and the process from step S103 onwards is repeated. Thus, a new pinch operation or the like can be accepted.

If it is determined in the determining process in step S306 that the contact of the finger or the like with the operating surface of the touch panel 107 has not ended (has been continuing), it is determined that the user has continued the enlarging process or reducing process of the display image, and the processing proceeds to the process in FIG. 15.

The control section 120 determines whether or not there has been no change in the contact position of the user's finger or the like held in contact with the operating surface of the touch panel 107 (step S307). If it is determined in the determining process in step S307 that there has been no change in the contact position of the finger or the like, the control section 120 pauses the display of a new image that is displayed on the display screen 6G after the enlarging process or reducing process of the display image, for the pause time t (step S308).

That is, the process in step S308 is a process of temporarily stopping the enlarging process or reducing process of the display image so that a new image displayed after the enlarging process or reducing process of the display image is paused for the pause time t. As mentioned above, the pause time t is the time specified in step S303.

Then, after the process in step S308, the control section 120 repeats the process from step S304 onwards shown in FIG. 14 so as to continue the enlarging process or reducing process of the display image. That is, the enlarging process or reducing process of the display image is resumed, and the enlarging process or reducing process of the display image is further performed.

If it is determined in the determining process in step S307 that there has been a change in the contact position of the finger or the like, the control section 120 determines that a new pinch operation or the like has been performed, and repeats the process from step S301 onwards shown in FIG. 14.

In this way, in the imaging apparatus 100 according to the third embodiment, enlarged display or reduced display of a display image is started by a pinch operation, and by keeping a finger or the like in contact with the operating surface of the touch panel 107 successively from the pinch operation, the enlarged display or reduced display of the display image can be continued.

In addition, even the pause time for the display image after the enlarged display or reduced display of the display image is controlled appropriately in accordance with the distance or speed of the pinch operation, so that the display image can be enlarged or reduced at a speed intended by the user, without the display image becoming hard to view.

In addition, the enlargement ratio or the reduction ratio which is set constant in the third embodiment mentioned above may be varied in accordance with the distance or speed of a pinch operation.

For example, the possible range of the distance of a pinch operation can be divided into a plurality of ranges in advance, and the enlargement ratio or the reduction ratio can be set for each of the divided ranges. Likewise, the possible range of the speed of a pinch operation can be divided into a plurality of ranges in advance, and the enlargement ratio or the reduction ratio can be set for each of the divided ranges.

In addition, the enlargement ratio or the reduction ratio can be also set on the basis of both the distance and speed of a pinch operation. For example, it is possible to set the enlargement ratio or the reduction ratio larger in the case when the distance of a pinch operation is longer than a predetermined threshold, and the speed of the pinch operation is faster than a predetermined threshold, or to set the enlargement ratio or the reduction ratio smaller in other cases.

In addition, it is also possible to set the enlargement ratio or the reduction ratio larger irrespective of the distance of a pinch operation in the case when the speed of the tracing operation is faster than a predetermined threshold, or to set the enlargement ratio or the reduction ratio larger irrespective of the speed of a tracing operation in the case when the distance of the tracing operation is longer than a predetermined threshold. Therefore, the enlargement ratio or the reduction ratio is set smaller in cases other than these, that is, when the distance of a tracing operation is short and the speed of the tracing operation is slow.

In this way, the enlargement ratio or reduction ratio of a display image can be controlled as appropriate on the basis of one or both of the distance and speed of a pinch operation.

[Fourth Embodiment]

Next, an imaging apparatus according to a fourth embodiment will be described. The imaging apparatus according to the fourth embodiment is also the imaging apparatus 100 configured as described with reference to FIG. 1. Thus, reference will be also made to FIG. 1 in the description of the imaging apparatus 100 according to the fourth embodiment as well.

In the case of the imaging apparatus 100 according to the fourth embodiment, when playing back moving image data shot by a moving image shooting mode, fast-forwarding or fast-reversing can be performed in accordance with a tracing operation.

In the case of an imaging apparatus capable of shooting moving images, a reduction in size and weight is desired, and since the size of its housing is also limited, it is not possible to provide various operating keys (hardware keys) on the housing.

For this reason, in the imaging apparatus, a control panel is displayed on the display screen, and a so-called software key is formed by this display and a touch panel attached to the display screen, thereby accepting various operation inputs.

When moving image data is being played back on such an imaging apparatus, changing the playback speed of the moving image can be performed as follows. First, a control panel is displayed on the display screen, and a button (fast-forward button or fast-reverse button) on the panel is depressed a plurality of times, thereby making it possible to change the playback speed in a stepwise manner.

However, with this method, it may be difficult to change the playback speed of a moving image quickly in some cases. Accordingly, in the imaging apparatus 100 according to the fourth embodiment, the playback speed can be changed to a more appropriate playback speed at the time of moving image playback by a simple operation of tracing the touch panel 107.

[Changing of Playback Speed During Moving Image Playback According to Fourth Embodiment]

Figure 16:
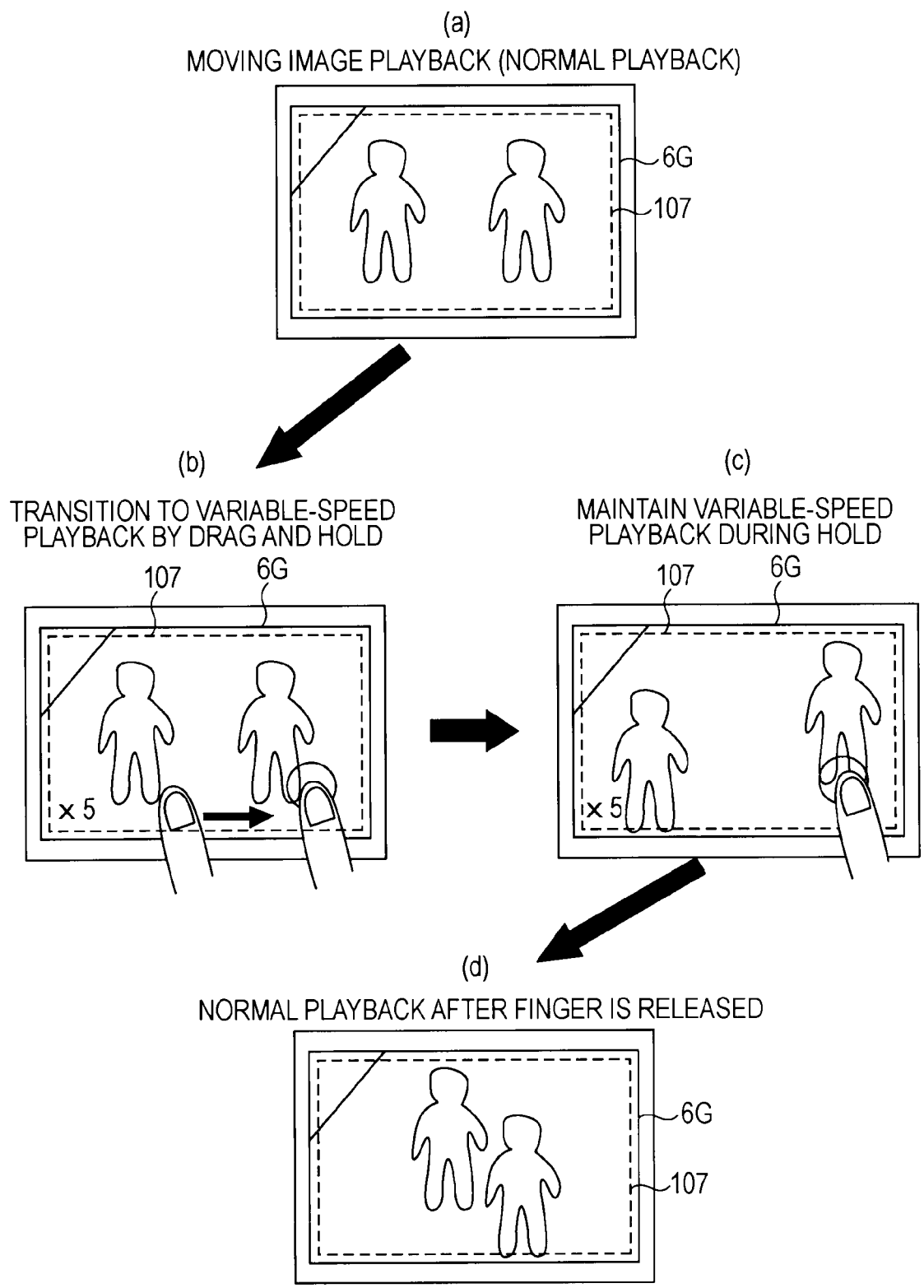
FIG. 16 is a diagram illustrating a changing process of playback speed at the time of moving image playback which is performed in an imaging apparatus according to a fourth embodiment.
Figure 17:
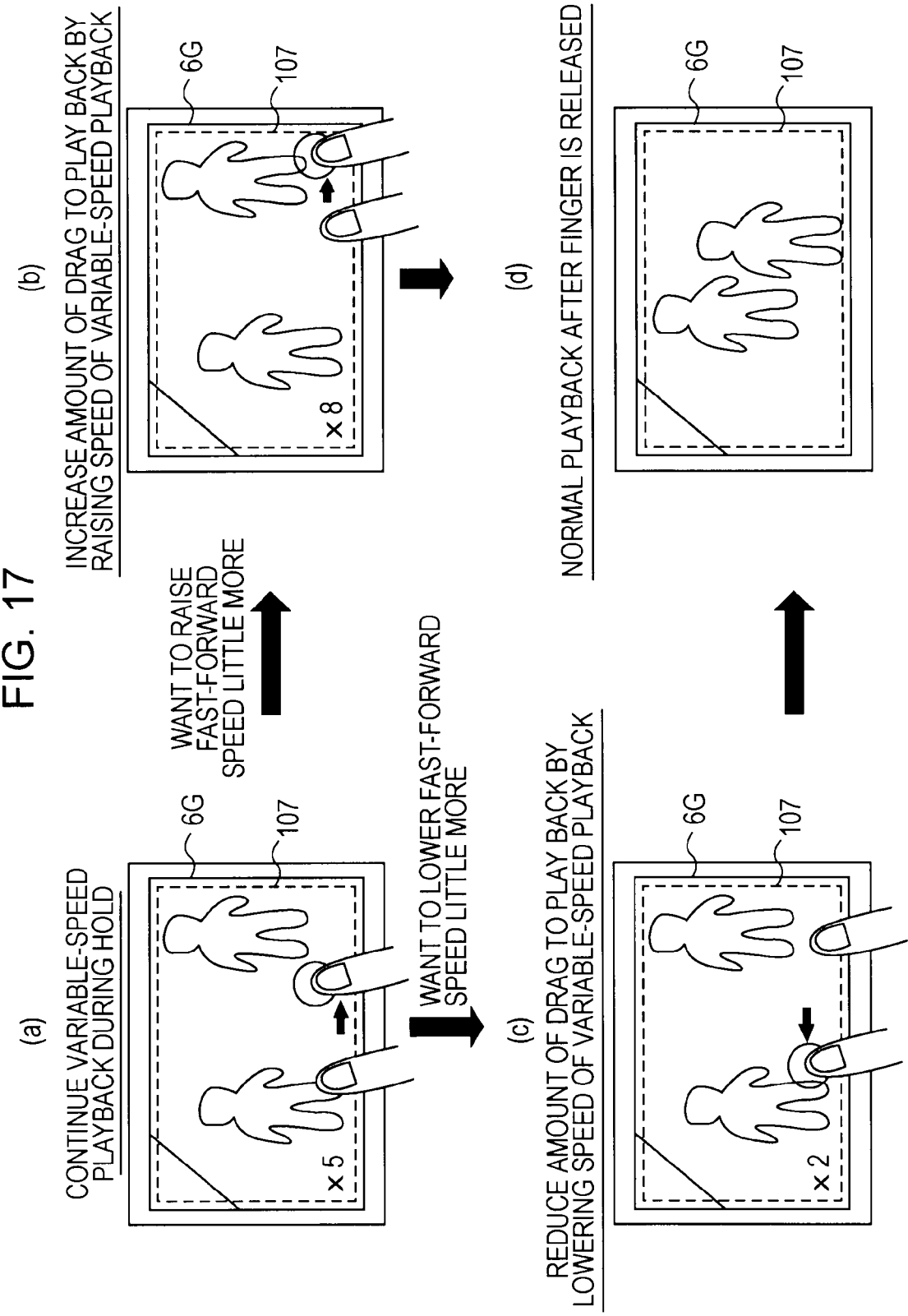
FIG. 17 is a diagram illustrating a changing process of playback speed at the time of moving image playback which is performed in the imaging apparatus according to the fourth embodiment.

FIGS. 16 and 17 are diagrams illustrating a changing process of playback speed during moving image display which is performed in the imaging apparatus 100 according to the fourth embodiment. In the imaging apparatus 100 according to the fourth embodiment, the playback speed of a moving image to be played back can be changed by a tracing operation on the operating surface of the touch panel 107.

FIG. 16 illustrates the case of changing the playback speed and then maintaining the changed playback speed. FIG. 17 illustrates the case of changing the playback speed and then further changing the changed playback speed.

First, referring to FIG. 16, a description will be given of the case of changing the playback speed and then maintaining the changed playback speed. Suppose that when a moving image is being played back at a normal playback speed as shown in FIG. 16(*a*), it becomes necessary for the user to perform fast-forward playback. In this case, as shown in FIG. 16(*b*), the user places a finger or the like in contact with the operating surface of the touch panel 107, and then performs a tracing operation from left to right as indicated by an arrow.

As mentioned above, in accordance with a pointing operation from the user, the touch panel 107 sequentially detects coordinate data indicating the pointed position, and notifies the control section 120 of the coordinate data. The control section 120 determines the operation made by the user, on the basis of the coordinate data from the touch panel 107.

When, as shown in FIG. 16(*b*), an operation of tracing the operating surface of the touch panel 107 from left to right is performed during moving image playback, the control section 120 determines that fast-forward playback has been instructed.

Then, the control section 120 specifies the playback speed in accordance with the distance and speed of the tracing operation made on the operating surface of the touch panel 107. For example, the playback speed is determined in a stepwise manner in accordance with the distance of the tracing operation such that the playback speed is the 3-times speed when the distance of the tracing operation falls within a first distance range, the 5-times speed when the distance of the tracing operation falls within a second distance range longer than the first distance range, and the 10-times speed when the distance of the tracing operation falls within a third distance range longer than the second distance range.

Alternatively, the playback speed is determined in a stepwise manner in accordance with the speed of the tracing operation such that the playback speed is the 3-times speed when the speed of the tracing operation falls within a first speed range, the 5-times speed when the speed of the tracing operation falls within a second speed range faster than the first speed range, and the 10-times speed when the speed of the tracing operation falls within a third speed range faster than the second speed range.

Alternatively, the playback speed may be determined by taking both the distance and speed of the tracing operation into consideration. It is also possible to determine the playback speed on the basis of the combination of the distance and speed of the tracing operation.

Then, the control section 120 starts playback of a display image at the specified playback speed. Specifically, playback of a moving image is performed by controlling the write/read section 134 to read moving image data to be played back, processing this moving image data via the decompression processing section 110, the enlarging/reducing section 111, and the display processing section 105, and supplying the processed moving image data to the display section 106.

By increasing the processing speed in this case or, depending on the playback speed, by thinning moving image data to be played back, the control section 120 can play back a moving image to be played back at a playback speed as instructed by the user.

In the case where a moving image is played back not at a normal playback speed but at an instructed playback speed in this way, as shown in FIG. 16(b), a rough indication of playback speed, such as "×5", is displayed in the lower left of the display image, for example. This display can be implemented by supplying display information to the display processing section 105, and combining the display information with the display image.

This display "×5" indicates that playback is being done at 5 times the normal playback speed. Therefore, "×3" is displayed when playback is being done at three times the normal playback speed, and "×10" is displayed when playback is being done at ten times the normal playback speed.

Then, as shown in FIG. 16(c), while a user's finger or the like is held in contact with the operating surface of the touch panel 107 successively from a tracing operation, the control section 120 controls individual sections so as to maintain the playback speed of the moving image which has been changed by the tracing operation.

Then, as shown in FIG. 16(d), when the user's finger or the like held in contact with the operating surface of the touch panel 107 successively from the tracing operation is released from the operating surface of the touch panel 107, the control section 120 controls individual sections so as to return the playback speed to the normal playback speed.

Next, referring to FIG. 17, a description will be given of the case of changing the playback speed and then further changing the changed playback speed. Suppose that when a moving image is being played back at a normal playback speed, it becomes necessary for the user to perform fast-forward playback.

In this case, as shown in FIG. 17(a), the user places a finger or the like in contact with the operating surface of the touch panel 107, and then performs a tracing operation from left to right as indicated by an arrow. The control section 120 controls individual sections as mentioned above, and changes the playback speed of a moving image being played back, in accordance with the tracing operation.

Then, by keeping the finger or the like in contact with the operating surface of the touch panel 107 successively from the tracing operation, as described with reference to FIG. 16, the user can play back the moving image while maintaining the changed playback speed.

FIG. 17(a) shows that the playback speed has been changed to 5-times speed ("×5"), and this speed is maintained.

In this case, when it is desired to raise the playback speed a little more, as shown in FIG. 17(b), the user performs a tracing operation of further moving the finger or the like held in contact with the operating surface of the touch panel 107 to the right side.

The control section 120 can detect that a further rightward tracing operation has been performed, on the basis of a change in coordinate data from the touch panel 107. In this case, the control section 120 determines that an operation of further raising the maintained playback speed has been performed, and controls individual sections so as to increase the playback speed.

FIG. 17(b) shows that the playback speed shown in FIG. 17(a) has been changed from 5-times speed ("×5") to 8-times speed ("×8"), and this playback speed is maintained.

Then, when, in the state shown in FIG. 17(b), the user's finger or the like held in contact with the operating surface of the touch panel 107 is released, as shown in FIG. 17(d), the control section 120 controls individual sections so as to return the playback speed to the normal playback speed.

Also, suppose that, as shown in FIG. 17(a), the playback speed is set as 5-times speed ("×5"), and this playback speed is maintained.

In this case, when it is desired to lower the playback speed a little more, as shown in FIG. 17(c), the user performs a tracing operation of further moving the finger or the like held in contact with the operating surface of the touch panel 107 to the left side.

The control section 120 can detect that a leftward tracing operation has been performed, on the basis of a change in coordinate data from the touch panel 107. In this case, the control section 120 determines that an operation of further lowering the maintained playback speed has been performed, and controls individual sections so as to reduce the playback speed.

FIG. 17(c) shows that the playback speed shown in FIG. 17(a) has been changed from 5-times speed ("×5") to 2-times speed ("×2"), and this playback speed is maintained.

Then, when, in the state shown in FIG. 17(c), the user's finger or the like held in contact with the operating surface of the touch panel 107 is released, as shown in FIG. 17(d), the control section 120 controls individual sections so as to return the playback speed to the normal playback speed.

While the example in FIGS. 16 and 17 is directed to the case of performing fast-forward playback, fast-reverse playback can be performed by performing a tracing operation from the right side to the left side on the operating surface of the touch panel 107.

Although the direction of the tracing operation becomes opposite to that in the case of the fast-forward playback mentioned above, during this fast-reverse playback as well, the playback speed during fast-reverse playback can be changed in a flexible manner as instructed by the user.

In some cases, it is desired to perform fast-forward playback first, and then successively perform fast-reverse playback. In such a case, the finger or the like is released from the operating surface of the touch panel 107 once, and after performing normal playback, a leftward tracing operation is performed, thereby making it possible to perform fast-reverse playback efficiently.

In this way, when a moving image is being played back, by placing a finger or the like in contact with the operating surface of the touch panel 107 attached to the display screen 6G, and performing a tracing operation without releasing the finger or the like from the operating surface of the touch panel 107, the playback speed of the moving image can be adjusted in a flexible manner.

[Details of Adjusting Process of Playback Speed According to Fourth Embodiment]

Figure 18:
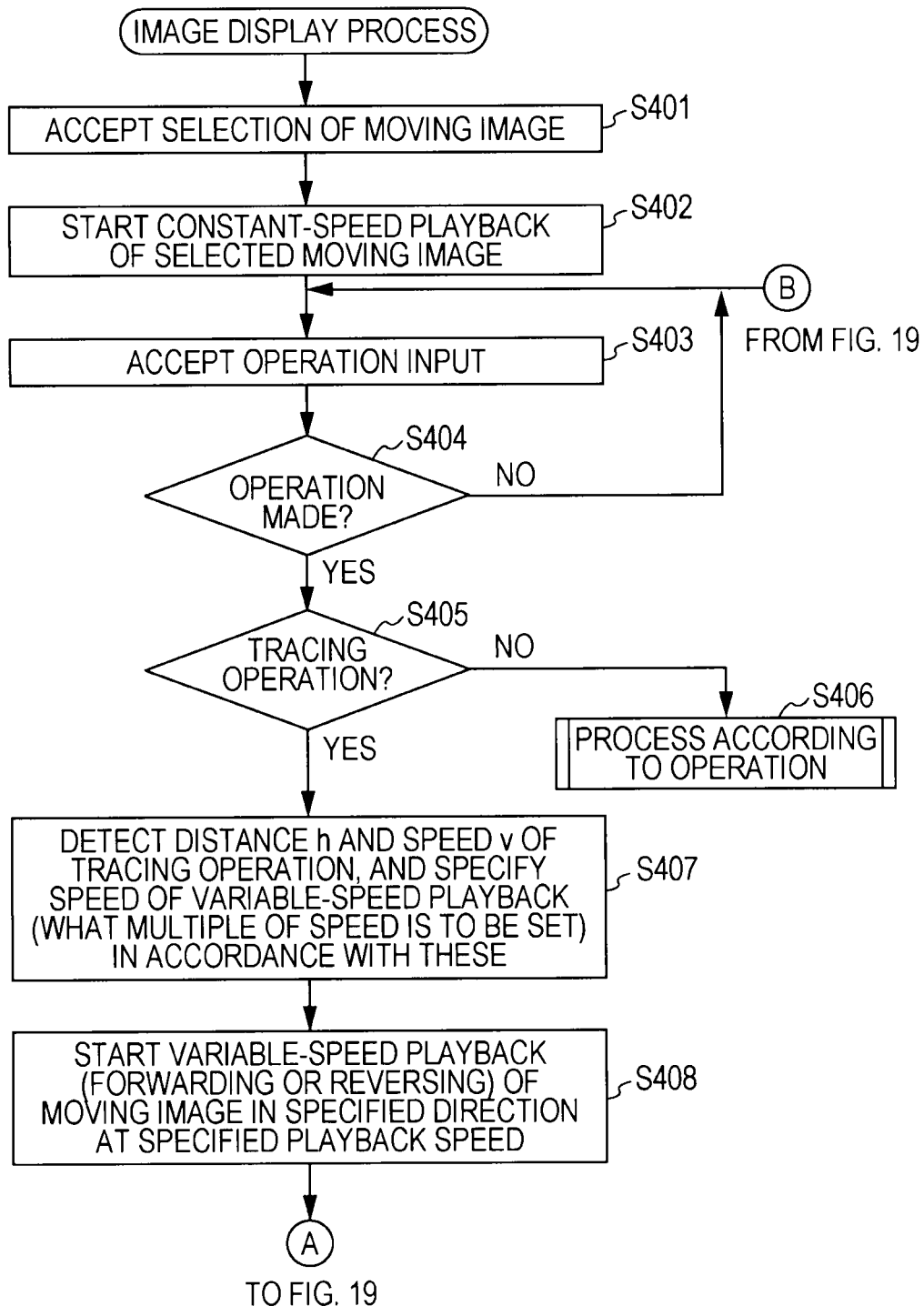
FIG. 18 is a flowchart illustrating a moving image playback process including an adjusting process of moving image playback speed which is performed in the imaging apparatus according to the fourth embodiment.
Figure 19:
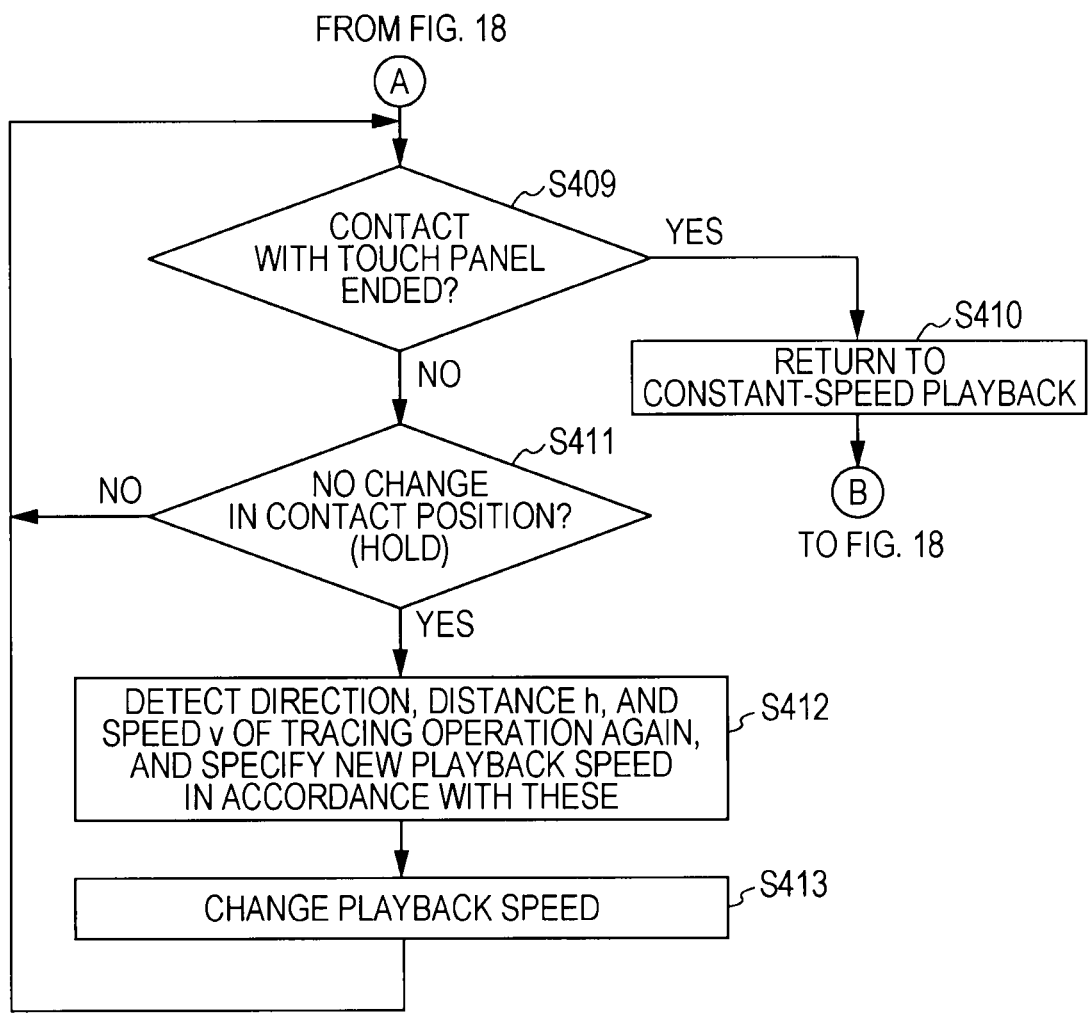
FIG. 19 is a flowchart continuing from FIG. 18.

Next, referring to the flowcharts in FIGS. 18 and 19, a description will be given of details about the adjusting process of moving image playback speed described with reference to FIGS. 16 and 17, which is performed in the imaging apparatus 100 according to the fourth embodiment. FIGS. 18 and 19 are flowcharts illustrating a moving image playback process including an adjusting process of moving image playback speed which is performed in the imaging apparatus 100 according to the fourth embodiment.

The process shown in FIGS. 18 and 19 is executed mainly by the control section 120 when, for example, a menu item called moving image playback process (playback process of a recorded moving image) is selected from a menu displayed on the display screen of the display section 106.

The menu is displayed on the display screen of the display section 106 by the controlling section 120 controlling the display processing section 105 and the like, when a predetermined operation such as a depressing operation on a menu key provided in the operating section 131 of the imaging apparatus 100 is performed.

Then, when the moving image playback process is selected from the menu, the control section 120 executes the process shown in FIGS. 18 and 19, and performs a process of accepting a selection input for selecting a moving image to be played back.

Specifically, in step S401, the control section 120 displays a list of moving image files recorded on the recording medium 135 and accepts a selection input.

In this regard, a list of moving image files displays in list form such information as the thumbnail images and shooting dates of representative images of individual moving image files. Thumbnail image data for displaying a thumbnail image is, for example, created in advance at appropriate timing after shooting, on the basis of the image data of the first frame of each moving image file, or the like, and appended to each moving image file as metadata. Of course, thumbnail image data may be created and displayed on the basis of the image data of each moving image file at the time of displaying a thumbnail image.

Thereafter, in step S402, the control section 120 starts a process of playing back the moving image data of a moving image file selected in step S401, and displaying a moving image on the display screen 6G of the display section 106 (step S402).

Specifically, in step S402, the control section 120 grasps to which moving image file each of thumbnail images displayed in list form corresponds. Accordingly, the control section 120 identifies a moving image file corresponding to a selected thumbnail image, and controls the write/read section 134 to read moving image data from the identified moving image files.

Then, the control section 120 processes the read image data in the decompression processing section 110, the reducing/enlarging section 111, and the display processing section 105, and supplies the processed image data to the display section 106, thereby displaying a moving image based on the selected image file on the entire surface of the display screen 6G of the display section 106.

As described above, the process in step S402 is a process (normal playback process) of reading moving image data of a moving image file selected by the user, and processing this moving image data to play back a moving image at normal playback speed on the display section 106.

Thereafter, the control section 120 is made to accept an operation input from the user via the touch panel 107 and the operating section 131 (step S403), and determines whether or not an operation input from the user has been accepted (step S404). If it is determined in the determining process in step S404 that an operation input from the user has not been accepted, the control section 120 repeats the process from step S403 onwards.

If it is determined in the determining process in step S404 that an operation input from the user has been accepted, the control section 120 determines whether or not the accepted operation input is a tracing operation for changing the playback speed (for fast-forward playback or fast-reverse playback) (step S405).

If it is determined in the determining process in step S405 that the accepted operation input is not a tracing operation, the control section 120 executes a process according to the accepted operation input from the user (step S406). In step S406, for example, various processes such as temporary stopping or stopping of the playback process are performed in accordance with the operation input.

If it is determined in the determining process in step S405 that the accepted operation input is a tracing operation, the control section 120 measures the distance h of the tracing operation and the speed v of the tracing operation, and specifies the speed of variable-speed playback (what multiple of speed is to be set) (step S407).

As mentioned above, the distance h of a tracing operation can be measured on the basis of coordinate data sequentially supplied from the touch panel 107. The speed of a tracing operation is found by dividing the measured distance of the tracing operation by the time period of the tracing operation.

In this regard, as mentioned above, the time period of a tracing operation can be grasped by measuring the time period from the start to end of the tracing operation, which can be grasped on the basis of coordinate data sequentially supplied from the touch panel 107, by the clock circuit 136.

Then, in accordance with the direction of the tracing operation, the control section 120 starts variable-speed playback (fast-forward playback or fast-reverse playback) of a moving image that is being played back, at the playback speed specified in step S407 (step S408).

After the process in step S408, the control section 120 proceeds to the process in step S19, checks the presence/absence of coordinate data from the touch panel 107, and determines whether or not the contact with the operating surface of the touch panel 107 has been continuing (step S409).

This determining process in step S409 is a process of determining whether or not the contact of a user's finger or the like with the operating surface of the touch panel has been continuing successively since the tracing operation.

If it is determined in the determining process in step S409 that the contact of the finger or the like with the operating surface of the touch panel 107 has ended, the control section 120 controls individual sections so as to return the moving image being played back at variable speed to the original constant-speed playback (normal speed playback) (step S410).

Thereafter, the control section 120 repeats the process shown in FIG. 18 from the process in step S403 onwards. Thus, a new tracing operation or the like can be accepted.

If it is determined in the determining process in step S409 that the contact of the finger or the like with the operating surface of the touch panel 107 has not ended (has been continuing), it is determined that the user has been continuing the variable-speed playback of the moving image.

Then, the control section 120 determines whether or not there has been no change in the contact position of the user's finger or the like held in contact with the operating surface of the touch panel 107 (step S411). If it is determined in the determining process in step S411 that there has been no change in the contact position of the finger or the like, the control section 120 repeats the process from step S409 onwards.

If it is determined in the determining process in step S411 that there has been a change in the contact position of the finger or the like, it can be determined that a tracing operation has been performed again. This tracing operation performed again means that an operation of adjusting the speed of variable-speed playback has been performed as mentioned above with reference to FIG. 17(*b*) and FIG. 17(*c*).

In this case, the control section 120 detects the direction of the tracing operation, the distance h of the tracing operation, and the speed v of the tracing operation, and specifies a new speed of variable-speed playback (what multiple of speed is to be set) (step S412).

Then, the control section 120 changes the playback speed of the moving image being played back so as to be the speed of variable-speed playback specified in step S412 (step S413). Thereafter, the process from step S409 onwards is repeated.

In this way, when a moving image is being played back, the playback speed of the moving images can be changed by a tracing operation on the touch panel 107. Then, by keeping the contact of the finger or the like with the operating surface of the touch panel 107 successively from the tracing operation, playback of the moving image can be performed so as to maintain the changed playback speed of the moving image.

Further, by performing a tracing operation again whereby the finger or the like that has been continuously held in contact with the operating surface of the touch panel 107 is moved on the operating surface, the playback speed of moving images can be adjusted (made faster or slower) again.

[Effects of Embodiments]

In the case of the first to third embodiments mentioned above, during playback of a still image, by performing a tracing operation or pinch operation and then holding the finger or the like in contact with the touch panel without releasing, successive image forwarding or reversing, or successive image enlargement or reduction can be performed.

In the case of the first to third embodiments mentioned above, the speed at which a display image is changed can be controlled in accordance with the distance or speed of a tracing operation, or the distance or speed of a pinch operation. Thus, retrieval of a desired image can be performed quickly and easily.

In the case of the second embodiment mentioned above, the display mode of an image can be changed by continuing the contact of the finger or the like with the operating surface of the touch panel successively from the tracing operation. Thus, retrieval of a desired image can be performed quickly and easily.

In the case of the fourth embodiment mentioned above, variable-speed playback of a moving image can be performed by performing a tracing operation during playback of the moving image. Then, after performing the tracing operation, by holding the finger or the like in contact with the touch panel as it is without releasing, the variable-speed playback of the moving image can be maintained as it is, and when a tracing operation is further performed from that state, the playback speed can be adjusted.

In the case of the first to fourth embodiments mentioned above, the necessity of performing an operation such as a tracing operation or a pinch operation a plurality of times on the operating surface of the touch panel can be reduced, thereby making it possible to give a desired change to the image by performing the operation a small number of times.

[Implementability of Method and Program]

As is apparent from each of the above-mentioned embodiments, a method and a program according to an embodiment of the present invention can be implemented as the method or the program described with reference to each of FIGS. 5 and 6, FIGS. 8 and 9, FIGS. 14 and 15, and FIGS. 18 and 19.

That is, the method described with reference to each of FIGS. 5 and 6, FIGS. 8 and 9, FIGS. 14 and 15, and FIGS. 18 and 19 is the method according to an embodiment of the present invention.

The program described with reference to each of FIGS. 5 and 6, FIGS. 8 and 9, FIGS. 14 and 15, and FIGS. 18 and 19 is the program according to an embodiment of the present invention.

Therefore, by implementing the program according to an embodiment of the present invention, and incorporating the program into a digital still camera or various kinds of image processing apparatus, the image processing apparatus according to an embodiment of the present invention can be implemented.

[Others]

In the above-mentioned embodiments, the display section 106 implements an image display device, the touch panel 107 implements pointed-position detecting means, the recording medium 135 implements storing means, and mainly the control section 120 implements display control means.

Also, mainly the clock circuit 136 implements measuring means for measuring a duration. The touch panel 107 and the control section 120 implement distance detecting means, the clock circuit 136 implements time provision means, and the touch panel 107, the control section 120, and the clock circuit 136 implement speed detecting means.

The threshold for the distance or speed of a tracing operation, or the threshold for the duration of contact of a finger or the like with the touch panel can be set to an appropriate value by taking conditions such as the performance of equipment into account.

While the above-mentioned embodiments are directed to the case in which the present invention is applied to an imaging apparatus, this should not be construed restrictively. For example, the present invention can be applied to a mobile telephone terminal with camera function, a mobile information terminal such as a so-called PDA (Personal Digital Assistant) capable of processing image data, and other various kinds of image processing apparatus capable of processing image data.

In the first and second embodiments mentioned above, an operation of tracing the display screen from right to left is set as an operation in the forward direction of time, and an operation of tracing the display screen from left to right is set as an operation in the reverse direction of time. However, this should not be construed restrictively.

Conversely, an operation of tracing the display screen from left to right may be set as an operation in the forward direction of time, and an operation of tracing the display screen from right to left may be set as an operation in the reverse direction of time.

In the fourth embodiment mentioned above, an operation of tracing the display screen from right to left is set as an operation for executing fast-forward playback, and an operation of tracing the display screen from left to right is set as an operation for executing fast-reverse playback. However, this should not be construed restrictively.

Conversely, an operation of tracing the display screen from left to right may be set as an operation for executing fast-reverse playback, and an operation of tracing the display screen from right to left may be set as an operation for executing fast-forward playback.

In the first and second embodiments mentioned above, retrieval of an image is performed by an operation of tracing the display screen in the horizontal direction. However, this should not be construed restrictively. It is also possible to set an operation of tracing the displaying screen in the vertical direction as an operation for retrieving an image. That is, it is also possible to perform image scrolling in the vertical direction of the display screen.

While it has been described in the above-mentioned embodiments that the touch panel is implemented as a pressure-sensitive or electrostatic one, this should not be construed restrictively. For example, it is possible to use touch panels of a type which can identify a pointed position by detecting a change in brightness due to proximity to a finger or the like. That is, it is possible to use touch panels of various configurations which can detect a position pointed by the user.

The present application contains subject matter related to that disclosed in Japanese Priority Patent Application JP 2008-295304 filed in the Japan Patent Office on Nov. 19, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An image processing apparatus, comprising:
   circuitry configured to
      control performing a scrolling process of an image at a first size on a display screen of an image display device in a case a pointing operation is detected at a position on an operating surface of the display screen;
      control continuing the scrolling process while simultaneously displaying a plurality of images at a second size smaller than the first size in response to a determination that the pointing operation is maintained at the position for a predetermined time; and
      control a termination of the scrolling process of the plurality of images at the second size and control displaying on the entire area of the display screen an image located at a center of the display screen at an end of the scrolling process, in response to a termination of the pointing operation.

2. The image processing apparatus according to claim 1, wherein the scrolling process is one of a scrolling process of a display image, an enlarged display process of the display image, a reduced display process of the display image, a fast-forward playback process of a moving image, and a fast-reverse playback process of the moving image.

3. The image processing apparatus according to claim 1, wherein the circuitry is further configured to measure, when the pointing operation is accepted on the operating surface, a duration of pointing according to the pointing operation on the operating surface.

4. The image processing apparatus according to claim 3, wherein the circuitry performs, when the scrolling process that is being performed is a scrolling process of a display image, the scrolling process after displaying information related to a date related to the display image, the plurality of images having the second size, and information related to an attribute of the display image, in different display areas.

5. The image processing apparatus according to claim 1, wherein the pointing operation accepted on the operating surface is a tracing operation or a pinch operation;
   the circuitry is further configured to
      detect a distance of the tracing operation or the pinch operation on the basis of a detection output,
      provide time information, and
      detect a speed of the tracing operation or the pinch operation on the basis of the detection output, and the time information, and
      control a manner of display of an image by the scrolling process on the basis of one or both of the distance of the tracing operation or the pinch operation which is detected, and the speed of the tracing operation or the pinch operation which is detected.

6. The image processing apparatus according to claim 1, wherein, when the scrolling process that is being performed is a scrolling process of the plurality of images, a scrolling is performed to shift plural images of the plurality of images at a time.

7. The image processing apparatus according to claim 1, wherein
   the pointing operation is stationary contact with the operating surface after a tracing operation across the operating surface,
   when the stationary contact is accepted, the circuitry starts and continues the scrolling process of scrolling through images displayed at the first size,
   when the stationary contact with the operating surface has been maintained for the predetermined time, the circuitry continues the scrolling while displaying a plurality of images having the second size smaller than the first size, and
   when the stationary contact with the operating surface ends, the circuitry stops the scrolling.

8. An image display method, comprising:
   controlling performing a scrolling process of an image at a first size on a display screen of an image display device in a case a pointing operation is detected at a position on an operating surface of the display screen;
   controlling continuing the scrolling process while simultaneously displaying a plurality of images at a second size smaller than the first size in response to a determination that the pointing operation is maintained at the position for a predetermined time; and
   controlling a termination of the scrolling process of the plurality of images at the second size and control displaying on the entire area of the display screen an image located at a center of the display screen at an end of the scrolling process, in response to a termination of the pointing operation.

9. The image display method according to claim 8, wherein
   the pointing operation is stationary contact with the operating surface after a tracing operation across the operating surface,
   when the stationary contact is accepted, the performing includes starting and continuing the scrolling process of scrolling through images displayed at the first size,
   when the stationary contact with the operating surface has been maintained for the predetermined time, the controlling includes continuing the scrolling while displaying a plurality of images having the second size smaller than the first size, and
   when the stationary contact with the operating surface ends, the controlling includes stopping the scrolling.

10. A non-transitory computer readable medium encoded with an image display program for causing a computer incorporated in an imaging processing apparatus to execute a method comprising:
   controlling performing a scrolling process of an image at a first size on a display screen of an image display device in a case a pointing operation is detected at a position on an operating surface of the display screen;
   controlling continuing the scrolling process while simultaneously displaying a plurality of images at a second size smaller than the first size in response to a determination that the pointing operation is maintained at the position for a predetermined time; and
   controlling a termination of the scrolling process of the plurality of images at the second size and control displaying on the entire area of the display screen an image located at a center of the display screen at an end of the scrolling process, in response to a termination of the pointing operation.

11. The non-transitory computer readable medium according to claim 10, wherein
- the pointing operation is stationary contact with the operating surface after a tracing operation across the operating surface,
- when the stationary contact is accepted, the performing includes starting and continuing the scrolling process of scrolling through images displayed at the first size,
- when the stationary contact with the operating surface has been maintained for the predetermined time, the controlling includes continuing the scrolling while displaying a plurality of images having the second size smaller than the first size, and
- when the stationary contact with the operating surface ends, the controlling includes stopping the scrolling.

12. An image processing apparatus, comprising:
- means for controlling performing a scrolling process of an image at a first size on a display screen of an image display device in a case a pointing operation is detected at a position on an operating surface of the display screen;
- means for controlling continuing the scrolling process while simultaneously displaying a plurality of images at a second size smaller than the first size in response to a determination that the pointing operation is maintained at the position for a redetermined time; and
- means for controlling a termination of the scrolling process of the plurality of images at the second size and control displaying on the entire area of the display screen an image located at a center of the display screen at an end of the scrolling process, in response to a termination of the pointing operation.

13. The image processing apparatus according to claim 12, wherein
- the pointing operation is stationary contact with the operating surface after a tracing operation across the operating surface,
- when the stationary contact is accepted, the means for displaying starts and continues the scrolling process of scrolling through images displayed at the first size,
- when the stationary contact with the operating surface has been maintained for the predetermined time, the means for displaying continues the scrolling while displaying a plurality of images having the second size smaller than the first size, and
- when the stationary contact with the operating surface ends, the means for displaying stops the scrolling.

* * * * *